United States Patent
Ohara et al.

(10) Patent No.: US 6,438,643 B1
(45) Date of Patent: Aug. 20, 2002

(54) ROM PROGRAMMING DEVICE, AND RELATED PROGRAM OUTPUT DEVICE, COMMUNICATION SYSTEM AND DATA STORAGE MEDIUM

(75) Inventors: Kiyotaka Ohara, Nagoya; Hiroshi Hattori, Gifu-ken, both of (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/232,650

(22) Filed: Jan. 19, 1999

(30) Foreign Application Priority Data

Jan. 19, 1998 (JP) .......................................... 10-008129

(51) Int. Cl.[7] .............................................. G06F 12/00
(52) U.S. Cl. ....................... 711/103; 711/104; 711/133; 711/159; 711/165
(58) Field of Search ................................. 711/103, 133, 711/134, 135, 159, 163, 165, 104; 717/11

(56) References Cited

U.S. PATENT DOCUMENTS

| | | | | |
|---|---|---|---|---|
| 5,210,854 A | * | 5/1993 | Beaverton et al. ............. | 717/11 |
| 5,500,742 A | * | 3/1996 | Kamijo ........................ | 358/448 |
| 5,553,266 A | * | 9/1996 | Metzger et al. ............. | 711/144 |
| 5,568,423 A | * | 10/1996 | Jou et al. ................ | 365/185.33 |
| 5,829,013 A | * | 10/1998 | Hasbun ....................... | 711/103 |

* cited by examiner

*Primary Examiner*—Matthew Kim
*Assistant Examiner*—Matthew D. Anderson
(74) *Attorney, Agent, or Firm*—Oliff & Berridge, PLC

(57) ABSTRACT

A programming device for programming a programmable storage area of a programmable ROM of a processing device which is assigned to effect a processing operation according to a processing program stored in the ROM, the programming device first copies a programming program in a RAM connected to a CPU which is connected to the programmable ROM as well as the RAM, and then replaces the processing program currently stored in the programmable storage area with a new processing program, according to the programming program stored in the RAM. The programming program may be either stored in the programmable storage area of the ROM, or received from a suitable program output device or a program transmitting device, together with the new processing program. Also disclosed are the program output device, the program transmitting device, and a communication system including a plurality of processing devices, the program transmitting device, and a network through which the processing devices are connected to the program transmitting device.

40 Claims, 18 Drawing Sheets

FIG. 8

200 DISPLAYED DEVICE LIST

| | 202 PRINTER FIRMWARE UPDATE | 203 NIC FIRMWARE UPDATE | 204 SELECT ALL SAME TYPE DEVICES | 205 END | | |
|---|---|---|---|---|---|---|
| ICON | DEVICE CLASS | DEVICE NAME | DEVICE STATUS | PRINTER FIRMWARE VERSION | NIC DEVICE NAME | NIC FIRMWARE VERSION | IP ADDRESS |
| □ | LASER PRINTER | 1660 | READY | Vr3 | 2010 | Vr3 | 133.151.12.30 |
| □ | LASER PRINTER | 1660 | READY | Vr1 | 2010 | Vr3 | 133.151.12.31 |
| □ | LASER PRINTER | 1661 | Cover-Open | Vr2 | 2100 | Vr2 | 133.151.56.70 |
| □ | LASER PRINTER | 1660 | READY | Vr3 | 2010 | Vr3 | 133.151.12.34 |
| □ | LASER PRINTER | 1661 | READY | Vr2 | 2100 | Vr2 | 133.151.56.78 |
| ▤ | COLOR LASER PRINTER | 2400 | READY | Vr1 | 2010 | Vr1 | 133.151.24.68 |
| ▭ | COLOR SCANNER | 5000 | READY | Vr3 | 2210 | Vr3 | 133.151.13.57 |

| DISPLAYED DEVICE LIST | PRINTER FIRMWARE UPDATE | NIC FIRMWARE UPDATE | SELECT ALL SAME TYPE DEVICES | END | | | 200 |
|---|---|---|---|---|---|---|---|
| ICON | DEVICE CLASS | DEVICE NAME | DEVICE STATUS | PRINTER FIRMWARE VERSION | NIC DEVICE NAME | NIC FIRMWARE VERSION | IP ADDRESS |
| | LASER PRINTER | 1660 | READY | Vr3 | 2010 | Vr3 | 133.151.12.31 |
| | LASER PRINTER | 1661 | Cover -Open | Vr2 | 2100 | Vr3 | 133.151.56.70 |
| | LASER PRINTER | 1660 | READY | Vr3 | 2010 | Vr2 | 133.151.12.34 |
| | LASER PRINTER | 1661 | READY | Vr2 | 2100 | Vr2 | 133.151.56.78 |
| | COLOR LASER PRINTER | 2400 | READY | Vr1 | 2010 | Vr1 | 133.151.24.68 |
| | COLOR SCANNER | 5000 | READY | Vr3 | 2210 | Vr3 | 133.151.13.57 |

FIG. 10

| | 202 DISPLAYED DEVICE LIST | 203 NIC FIRMWARE UPDATE | 204 SELECT ALL SAME TYPE DEVICES | 205 END | | 200 |
|---|---|---|---|---|---|---|
| ICON | DEVICE CLASS | DEVICE NAME | DEVICE STATUS | PRINTER FIRMWARE VERSION | NIC DEVICE NAME | NIC FIRMWARE VERSION | IP ADDRESS |
| | LASER PRINTER | 1660 | READY | Vr3 | 2010 | Vr3 | 133.151.12.30 |
| | LASER PRINTER | 1660 | READY | Vr1 | 2010 | Vr3 | 133.151.12.33 |
| | LASER PRINTER | 1661 | Cover -Open | Vr2 | 2100 | Vr2 | 133.151.56.70 |
| | LASER PRINTER | 1660 | READY | Vr3 | 2010 | Vr3 | 133.151.12.34 |
| | LASER PRINTER | 1661 | READY | Vr2 | 2100 | Vr2 | 133.151.56.78 |
| | COLOR LASER PRINTER | 2400 | READY | Vr1 | 2010 | Vr1 | 133.151.24.68 |
| | COLOR SCANNER | 5000 | READY | Vr3 | 2210 | Vr3 | 133.151.13.57 |

| | | | | 203 | 204 | 204a | 204b | 205 | 200 |
|---|---|---|---|---|---|---|---|---|---|
| 202 | DISPLAYED DEVICE LIST | | | NIC FIRMWARE UPDATE | SELECT ALL SAME PRINTERS | SELECT ALL SAME NICs | END | | |
| PRINTER FIRMWARE UPDATE | | | | | | | | | |
| ICON | DEVICE CLASS | DEVICE NAME | DEVICE STATUS | PRINTER FIRMWARE VERSION | NIC DEVICE NAME | NIC FIRMWARE VERSION | IP ADDRESS | | |
| | LASER PRINTER | 1660 | READY | Vr3 | 2010 | Vr3 | 133. 151. 12. 30 | | |
| | LASER PRINTER | 1660 | READY | Vr1 | 2010 | Vr3 | 133. 151. 12. 31 | | |
| | LASER PRINTER | 1661 | Cover -Open | Vr2 | 2100 | Vr2 | 133. 151. 56. 70 | | |
| | LASER PRINTER | 1660 | READY | Vr3 | 2010 | Vr3 | 133. 151. 12. 34 | | |
| | LASER PRINTER | 1661 | READY | Vr2 | 2100 | Vr2 | 133. 151. 56. 78 | | |
| | COLOR LASER PRINTER | 2400 | READY | Vr1 | 2010 | Vr1 | 133. 151. 24. 68 | | |
| | COLOR SCANNER | 5000 | READY | Vr3 | 2210 | Vr3 | 133. 151. 13. 57 | | |

201

ROM PROGRAMMING DEVICE, AND RELATED PROGRAM OUTPUT DEVICE, COMMUNICATION SYSTEM AND DATA STORAGE MEDIUM

This Application is based on Japanese Patent Application No. 10-008129 filed Jan. 19, 1998, the content of which is incorporated hereinto by reference.

BACKGROUND OF THE INVENTION

1. Field of the Invention

The present invention relates to techniques for programming or reprogramming a programmable portion of a programmable read-only memory (programmable ROM, or PROM), that is, for erasing a processing program such as a firmware already stored in the programmable portion of the programmable ROM. More particularly, this invention is concerned with: a programming device for programming a programmable ROM; a program output device for generating a program to be supplied to at least one processing device including the programmable ROM; a communication system including the program output device and a plurality of processing devices; and a data storage medium storing a software program for operating the communication system.

2. Discussion of the Related Art

There is known a read-only memory (ROM) for storing data such that the stored data can only be read. The data stored in such a ROM often include a processing program for various control purposes. There has recently been developed a programmable ROM (PROM) such as a flash ROM, which includes a programmable portion which normally serves as an ordinary read-only memory and can be reprogrammed according to a predetermined programming program. Namely, a processing program originally or currently stored in the programmable portion of the programmable ROM can be replaced by a newly written processing program. Conventionally, the programmable portion is programmed according to a programming program, in the following procedure, for example.

Where the programming program is stored in the ROM which includes a programmable portion to be programmed, this programming is not possible due to different electric characteristics to be exhibited upon data reading and writing from and into the programmable portion. In view of this, it is considered to provide two programmable ROMs each of which stores the programming program. In this case, the programmable portion of one of these two programmable ROMs can be programmed according to the programming program stored in the programmable portion of the other programmable ROM.

It is also considered to divide a programmable ROM into two halves each of which stores the programming program. In this case, the programmable of one of the two halves of the ROM can be programmed according to the programming program stored in the other half.

In the former case, a device in question must employ two programmable ROMs and therefore tends to be complicated in physical construction. Further, some degree of control correlation is required between the two programmable ROMs, and the control system is accordingly complicated. In the latter case wherein the programmable program is stored at each of two portions of the programmable ROM, the storage capacity available is accordingly reduced. In addition, the programming operation must be implemented for each of the two halves of the programmable ROM, resulting in reduced programming efficiency.

SUMMARY OF THE INVENTION

It is a first object of the present invention to provide a programming device which permits efficient programing of a programmable ROM.

It is a second object of this invention to provide a program output device which is suitably constructed to generate a processing program to be supplied to such a programming device so that a processing program currently stored in the programmable ROM is replaced with the supplied processing program.

It is a third object of this invention to provide a communication system which comprises such a program transmitting device and a plurality of processing devices each including a programmable ROM.

It is a fourth object of the invention to provide a data storage medium storing a software program for operating such a communication system.

The first object indicated above may be achieved according to a first aspect of this invention, which provides a programming device for programming a programmable ROM having a programmable storage area which can be programmed and which stores a programming program for programming said programmable storage area, and a processing program for effecting a processing operation other than the programming of the programmable storage area, the programming device comprising: copying means for copying the programming program into a RAM connected to a CPU which is connected to the programmable ROM as well as the RAM; and programming means for replacing the processing program currently stored in the programmable storage area with a new processing program, according to the programming program stored in the RAM.

In the programming device constructed according to the first aspect of this invention, the programming program stored in the programmable storage area of the programmable ROM is copied by the copying means, into the RAM which is connected to the CPU which is also connected to the programmable ROM. The programmable storage area is programmed, that is, the processing program currently stored in the programmable storage area is replaced with a new processing program, according to the programming program currently stored in the RAM.

Thus, the present programming device is adapted to program or reprogram (rewrite) the programmable storage area, according to the programming program which has been copied into the RAM, so that the programmable storage area can be programmed at one time, namely, the processing program currently stored in the programmable storage area can be replaced with the desired new processing program at one time. Accordingly, the present programming device permits efficient programming of the programmable storage area of the programmable ROM in a reduced processing time, with simple mechanical and control arrangements, and without reducing the effective data storage capacity of the programmable ROM.

In a first preferred form of the programming device according to the first aspect of this invention, the programming means commands the CPU to execute the programming program stored in the RAM, to thereby program the programmable storage area. In this case, the programming device further comprises resetting means operable upon completion of programming of the programmable storage area by the programming means, for commanding the CPU to execute program data stored in the programmable ROM.

In the above first preferred form of the invention, the programming device commands the CPU to execute the programming program stored in the RAM, to rewrite the processing program stored in the programmable storage area of the programmable ROM. When the programmable storage area has been programmed or rewritten, the data stored in the programmable ROM are executed. The program data stored in the programmable ROM after completion of programming of the programmable storage area may include the new processing program which has been stored in the programmable storage area by the programing means, and/or a program stored in a non-programmable storage area of the programmable ROM.

The programming device according to the present first preferred form of the invention permits initiation of normal operations of a device including the programmable ROM, as soon as the programmable storage area has been programmed (as soon as the desired new processing program has been rewritten in the programmable storage area). Thus, the present programming device assures efficient programming of the programmable storage area of the programmable ROM.

In a second preferred form of the first aspect of this invention, the programming device further comprises program receiving means for receiving the new processing process to be newly stored in the programmable storage area, and the copying means and the programming means are operable, upon reception of the new processing program by the program receiving means, to copy the programming program into the RAM and write the new processing program in the programmable storage area, in place of the processing program which is stored in the programmable storage area upon the reception of the new processing program.

In the above second preferred form of the programming device, the copying means and the programming means are operable when the program receiving means has received the new processing program, in order to copy the programming program into the RAM and to program the programmable storage area of the programmable ROM by newly writing the new processing program therein. Thus, the original processing program which has been stored in the programmable storage area before the new processing program has been received is automatically replaced with the new processing program received by the program receiving means.

The program receiving means further facilitates the programming of the programmable storage area by replacing the original processing program with the new processing program.

In one advantageous arrangement of the above second preferred form of the invention, the programmable ROM is provided in each of a plurality of processing devices which are connected to each other through a communication network and each of which is operated according to the processing program stored in said programmable storage area of the programmable ROM. In this arrangement, the programmable ROMs of all of the processing devices may be efficiently and easily programmed by the new processing program transmitted thereto through the communication network. However, the program receiving means need not be adapted to receive the new processing program through the communication network, but may be adapted to receive it in any other fashion, for instance, by inserting a program cartridge into a card slot provided in each processing device.

The first object may also be achieved according to a second aspect of this invention, which provides a programming device for programming a programmable ROM having a programmable storage area which can be programmed and which stores a processing program, the programming device comprising: program receiving means for receiving a new processing program which is to replace the processing program currently stored in the programmable storage area of the programmable ROM, and a programming program for programming the programmable storage area by replacing the currently stored processing program with the new processing program; copying means operable upon reception of the new processing program and the programming program by the program receiving means, for copying the programming program into a RAM connected to a CPU which is connected to the programmable ROM as well as the RAM; programming means for commanding the CPU to execute the programming program stored in the RAM, to thereby replace the processing program currently stored in the programmable storage area with the new processing program; and resetting means operable upon completion of programming of the programmable storage area by the programming means, for commanding the CPU to execute program data currently stored in the programmable ROM.

In the programming device constructed according to the second aspect of this invention, the copying means copies the programming program into the RAM, when the program receiving means has received the programming program together with the new processing program. Then, the programming means commands the CPU to execute the programming program, to program the programmable storage area of the programmable ROM, and the resetting means is operated upon completion of programming of the programmable storage area, for commanding the CPU to execute program data stored in the programmable ROM.

The present programming device has substantially the same advantages as the programming device according to the first aspect of the invention and its preferred forms which have been described above. That is, the programmable storage area of the programmable ROM can be easily and efficiently programmed (the new processing program can be easily and efficiently rewritten in the programmable storage area) according to the programming program which has been received and copied into the RAM, and a device including the programmable ROM can initiate its normal operations as soon as the programmable storage area has been programmed. In the present programming device, the programming program need not be stored in the programmable storage area of the programmable ROM. That is, the programming program is received by the program receiving means only when the programmable ROM is programmed. Accordingly, the data storage capacity of the programmable ROM can be fully utilized, without a need of storing the programming program in the programmable storage area.

In one preferred form of the programming device according to the second aspect of this invention, the program receiving means receives the new processing program together with an identifier identifying the new processing program, and the programming device further comprises determining means for determining, based on this identifier, whether the processing program currently stored in the programmable storage area of the programmable ROM should be replaced with the new processing program. In this form of the invention, the programming means is inhibited from replacing the processing program currently stored in the programmable storage area with the new processing program, when the determining means determines that the processing program currently stored in the programmable storage area should not be replaced with the new processing program.

The above preferred form of the programming device is adapted such that when the program receiving means has received the the new processing program together with its identifier, the determining means determines whether the programmable storage area should be reprogrammed with the new processing program which is identified by the identifier. If the determining means determines that the programmable storage area should not be reprogrammed with the new processing program, the programming means is inhibited from operating to program the programmable storage area. Thus, the present programming device is effectively prevented from performing an unnecessary operation of programming the programmable storage area of the programmable ROM, for instance, writing the new processing program in the programmable storage area where the new processing program is identical with the processing program which has been stored in the programmable storage area.

Thus, the present preferred from of the second aspect of this invention assures further improved efficiency of programming of the programmable ROM, by inhibiting the unnecessary programming of the programmable storage area.

The second object indicated above may be achieved according to a third aspect of this invention, which provides a program output device comprising output means for generating a new processing program which is to replace an original processing program stored in a programmable storage area of a programmable ROM included in a processing device which further includes a CPU operable to execute the processing program, and a RAM for temporarily storing data for use by the CPU to execute the processing program, the program output device being characterized in that the output means supplies the processing device with the new processing program, and (a) an indicator informing the processing device that the original processing program currently stored in the programmable storage area is to be replaced with the new processing program, (b) a programming program for replacing the original processing program with the new processing program, and (c) a software program for commanding the CPU to copy the programming program into the RAM, and to execute the programming program stored in the RAM, to thereby replace the original processing program with the new processing program.

In the program output device constructed according to the third aspect of this invention, the output means of the program output device supplies the processing device with not only the new processing program, but also the indicator indicating the processing device that the original processing program is to be replaced with the new processing program, the programming program for replacing the original processing program with the new processing program, and the software program for commanding the CPU to copy the programming program into the RAM and to execute the programming program stored in the RAM, to thereby replace the original processing program with the new processing program.

When the above-indicated indicator is received by the processing device, the data generated by the output means of the program output device are stored in the programmable ROM, so that according to the software program, the programming program is copied into the RAM, and the original processing program currently stored in the programmable storage area of the programmable ROM is replaced with the new processing program according to the programming program. Accordingly, the processing device including the programmable ROM is operated according to the software program, to program the programmable storage area according to the programming program which has been stored in the RAM, as in the programming device according to the first aspect of this invention.

The output means may be adapted to transmit the new processing program, the indicator, the programming program and the software program, to the processing device through a communication line. Alternatively, the output means may be adapted to supply those data to be stored in an IC cartridge which is inserted into a card slot provided in the processing device. The processing device may be provided with suitable means for storing or not storing the above-indicated data therein. The indicator need not be a command for commanding the CPU of the processing device to replace the original processing program with the new processing program. Where the processing device is equipped with the programming device comprising the program receiving means as described above with respect to the preferred form of the first aspect of this invention, the indicator information may simply indicate that the series of data including this indicator include the new processing program.

In one preferred form of the program output device according to the third aspect of this invention, the processing device which is supplied with the new processing program, the indicator, the programming program and the software program is one of a plurality of imaging devices of different types each arranged to reproduce an image, and the new processing program includes an address indicative of the programmable ROM of the above-indicated one of the plurality of imaging devices.

In a system including a plurality of imaging devices of different type, different processing programs are stored in the programmable storage areas of the programmable ROMs of the imaging devices. In this system, the new programming program which is supplied to one of the imaging devices includes an address which indicates the programmable ROM of the above-indicated one imaging device, so that the new processing program is stored in the programmable storage area of the programmable ROM indicated by the address. This arrangement permits correct and efficient programming of the programmable area of the programmable ROM of the desired one of the imaging devices.

The third object indicated above may be achieved according to a fourth aspect of this invention, which provides a communication system comprising: a plurality of processing devices each of which includes a programmable ROM having a programmable storage area which can be programmed and which stores a processing program, a CPU operable to execute the processing program, and a RAM for temporarily storing data for use by the CPU to execute the processing program; a program transmitting device including transmitting means for transmitting a new processing program to selected at least one of the plurality of processing devices, so that the processing program currently stored in the programmable storage area of the programmable ROM of each of the selected at least one of the processing devices is replaced with the new processing program; and a network through which the program transmitting device is connected to the plurality of processing devices, and wherein the program transmitting device further includes: listing means for listing at least one of the plurality of processing devices to which the new processing program can be transmitted by the transmitting means; and selecting means for selecting at least one of the at least one processing device listed by the listing means, to which the new processing program is desired to be transmitted by the transmitting means, and wherein the transmitting means of the program transmitting device transmits to each of the at least one processing device selected by the selecting means, the new processing program, and (a) an indicator informing the processing device that the original processing program currently stored in the programmable storage area is to be replaced with the new processing program, (b) a programming program for replacing the original processing program with the new processing program, and (c) a software program for commanding the CPU to copy the programming program into the RAM, and to execute the programming program stored in the RAM, to thereby replace the original processing program with the new processing program.

In the communication system constructed according to the fourth aspect of this invention, each of the processing devices includes a programmable ROM having a programmable storage area, and the new processing program is transmitted by the transmitting means of the program transmitting device through the network to at least one of the processing devices which is selected by the selecting means. The listing means of the program transmitting device is adapted to list all the processing devices to which the new processing program can be transmitted by the transmitting means, and the operator of the program transmitting device operates the selecting means to select at least one of the listed processing devices, so that the new processing program is transmitted to the selected processing device or devices. Thus, the new processing program can be transmitted by the transmitting means to only the desired processing device or devices.

Further, the transmitting means of the program transmitting device transmits to each of the at least one processing device selected by the selecting means, not only the new processing program, but also the indicator indicating the processing device that the original processing program currently stored in the programmable storage area of the programmable ROM of the processing device is to be replaced with the new processing program, the programing program for replacing the original processing program with the new processing program, and the software program for commanding the CPU to copy the programming program into the RAM and to execute the programming program stored in the RAM, to replace the original processing program with the new processing program.

Like the program output device according to the third aspect of this invention described above, the program transmitting device permits each processing device to function as the programming device according to the first aspect of this invention, when the new processing program, the programming program and the software program have been stored in the programmable ROM of the processing device, according to the indicator received by the processing device. Namely, the CPU is operated according to the software program, to copy the programming program into the RAM and to execute the programming program so as to program the programmable storage area of the programmable ROM of the processing device.

In the present communication system, the program transmitting device permits the transmission of the new processing program, the indicator, the programming program and the software program, to only the selected processing device or devices, so that each selected processing device may function as the programming device according to the first aspect of this invention. The indicator need not be a command for commanding the CPU of the processing device to replace the original processing program with the new processing program. The indicator may simply indicate that the series of data including this indicator include the new processing program.

The third object may also be achieved according to a fifth aspect of this invention, which provides a communication system comprising: a plurality of processing devices each of which includes a programmable ROM having a programmable storage area which can be programmed and which stores a processing program, a CPU operable to execute the processing program, and a RAM for temporarily storing data for use by the CPU to execute the processing program; a program transmitting device including transmitting means for transmitting a new processing program to selected at least one of the plurality of processing devices, so that the processing program currently stored in the programmable storage area of the programmable ROM of each of the selected at least one of the processing devices is replaced with the new processing program; and a network through which the program transmitting device is connected to the plurality of processing devices, and wherein at least one of the plurality of processing devices includes the programming device according to the second preferred form of the first aspect of this invention described above, and the program transmitting device further includes: listing means for listing at least one of the plurality of processing devices to which the new processing program can be transmitted by the transmitting means; and selecting means for selecting at least one of the at least one processing device listed by the listing means, to which the new processing program is desired to be transmitted by the transmitting means.

In the communication system constructed according to the fifth aspect of this invention, each of the processing devices includes a programmable ROM having a programmable storage area, and the new processing program is transmitted by the transmitting means of the program transmitting device through the network to at least one of the processing devices which is selected by the selecting means. The listing means of the program transmitting device is adapted to list all the processing devices to which the new processing program can be transmitted by the transmitting means, and the operator of the program transmitting device operates the selecting means to select at least one of the listed processing devices, so that the new processing program is transmitted to the selected processing device or devices. Thus, the new processing program can be transmitted by the transmitting means to only the desired processing device or devices.

Further, at least one of the processing devices includes the programming device according to the second preferred form of the first aspect of the invention described above. When the new processing program is transmitted by the transmitting means to the processing device including the programming device, the new processing program is received by the program receiving means of the programming device, so that the original processing program currently stored in the programmable storage area of the programmable ROM of the processing device in question is automatically replaced by the received new processing program. Thus, the present communication system permits automatic and easy programming of the programmable storage area of the programmable ROM of each selected processing device. Unlike the communication system according to a sixth aspect of this invention which will be described, the present communication system does not require the program transmitting device to transmit the programming program to the programming device of the selected processing device. Accordingly, the program transmitting device is simplified in construction and control arrangement, and the cost of operation of the program transmitting device due to the use of the communication network such as a telephone line is significantly reduced.

The third object may also be achieved according to a sixth aspect of this invention, which provides a communication system comprising: a plurality of processing devices each of which includes a programmable ROM having a programmable storage area which can be programmed and which stores a processing program, a CPU operable to execute the processing program, and a RAM for temporarily storing data for use by the CPU to execute the processing program; a program transmitting device including transmitting means for transmitting a new processing program to selected at least one of the plurality of processing devices, so that the processing program currently stored in the programmable storage area of the programmable ROM of each of the selected at least one of the processing devices is replaced with the new processing program; and a network through which the program transmitting device is connected to the plurality of processing devices, and wherein at least one of the plurality of processing devices includes the programming device according to the second aspect of this invention described above, and the program transmitting device further includes: listing means for listing at least one of the plurality of processing devices to which the new processing program can be transmitted by the transmitting means; and selecting means for selecting at least one of the at least one processing device listed by the listing means, to which the new processing program is desired to be transmitted by the transmitting means, and wherein the transmitting means transmits the programming program together with the new processing program to the program receiving means of the programming device of each of the at least one processing device selected by the selecting means.

In the communication system constructed according to the sixth aspect of this invention, each of the processing devices includes a programmable ROM having a programmable storage area, and the new processing program is transmitted by the transmitting means of the program transmitting device through the network to at least one of the processing devices which is selected by the selecting means. The listing means of the program transmitting device is adapted to list all the processing devices to which the new processing program can be transmitted by the transmitting means, and the operator of the program transmitting device operates the selecting means to select at least one of the listed processing devices, so that the new processing program is transmitted to the selected processing device or devices. Thus, the new processing program can be transmitted by the transmitting means to only the desired processing device or devices.

Further, at least one of the plurality of processing devices includes the programming device according to the second aspect of this invention described above, and the transmitting means of the program transmitting device is adapted to transmit the programming program together with the new processing program to the program receiving means of the programming device of each of the at least one processing device selected by the selecting means. Upon reception of the programming program and the new processing program by the program receiving means, the new processing program is automatically written in the programmable storage area of the programmable ROM of the processing device in question, by the programming device according to the programming program. Upon completion of programming of the programmable storage area, the resetting means is operated to command the CPU of the processing device to execute program data currently stored in the programmable ROM. Thus, the programmable storage area of the programmable ROM of only the selected processing device or devices can be automatically and easily programmed.

Unlike the communication system according to the above-described fifth aspect of the invention, the present communication system does not require the programming program to be stored in the programmable ROM, leading to an increased effective data storage of the programmable ROM.

In one preferred form of the sixth aspect of the invention,

In one preferred form of the fourth, fifth and sixth aspects of this invention described above, the program transmitting device further includes: device information obtaining means for obtaining device information indicative of a type of each of the processing devices listed by the listing means; and device classifying means for classifying the processing devices, based on the device information obtained by the device information obtaining means, and wherein the selecting means is selectively operable in a first mode in which the processing devices are sequentially selected one after another, and in a second mode in which the processing devices of the same type are selected at one time.

Some processing programs are compatible with respective different types of processing devices. In some situation, it is desired to program (reprogram) the programmable storage area of the programmable ROM of each of only the processing devices of a specific type. In the present preferred form of the communication system, the device information indicative of the type of each the processing devices listed by the listing means is obtained by the device information obtaining means, and the listed processing devices are classified into different types by the device classifying means. The selecting means has two operation modes. In the first mode, the desired processing devices of the same type or different types are sequentially selected one after another. In the second mode, the processing devices of the desired same type are selected at one time. This arrangement facilitates the selection of the desired processing devices of the same type or different types, so that the programmable storage areas of the programmable ROMs of the desired processing devices can be programmed with high efficiency.

The third object may also be achieved according to a seventh aspect of this invention, which provides communication system comprising: a plurality of processing devices each of which includes a programmed ROM having a programmable storage area which can be programmed and which stores a processing program, a CPU operable to execute the processing program, and a RAM for temporarily storing data for use by the CPU to execute the processing program; a program transmitting device including transmitting means for transmitting a new processing program to selected at least one of the plurality of processing devices, so that the processing program currently stored in the programmable storage area of the programmable ROM of each of the selected at least one of the processing devices is replaced with the new processing program; and a network through which the program transmitting device is connected to the plurality of processing devices, and wherein the program transmitting device further includes: listing means for listing the processing devices to which the new processing program can be transmitted by the transmitting means; selecting means for selecting at least one of the at least one processing device listed by the listing means, to which the new processing program is desired to be transmitted by the transmitting means; device information obtaining means for obtaining device information indicative of a type of each of the processing devices listed by the listing means; and device classifying means for classifying the processing devices, based on the device information obtained by the device information obtaining means, and wherein the selecting means is selectively operable in a first mode in which the processing devices are sequentially selected one after another, and in a second mode in which the processing devices of the same type are selected at one time.

Like the preferred form of the communication system according to the sixth aspect of the invention, the present communication system is arranged such that the device information indicative of the type of each the processing devices listed by the listing means is obtained by the device information obtaining means, and the listed processing devices are classified into different types by the device classifying means. The selecting means is selectively operable in the first mode in which the desired processing devices of the same type or different types are sequentially selected one after another, and the second mode in which the processing devices of the desired same type are selected at one time. This arrangement facilitates the selection of the desired processing devices of the same type or different types, so that the programmable storage areas of the programmable ROMs of the desired processing devices can be programmed with high efficiency.

In one preferred form of the communication system according to the fourth, fifth, sixth and seventh aspects of this invention described above, the new processing program transmitted by the transmitting means of the program transmitting device is accompanied by an identifier identifying the new processing program, and wherein the program transmitting device further includes: device information obtaining means for obtaining device information indicative of a type of each of the processing devices listed by the listing means, before the new processing program is transmitted by the transmitting means; and warning means for providing a warning if the type of the processing device indicated by the device information obtained by the device information obtaining means is not compatible with the new processing program identified by the identifier.

In the above preferred form of the communication system, the new processing program transmitted by the transmitting means is accompanied by an identifier which identifies the new processing program, and the device information obtaining means obtains device information indicative of the type of each processing device listed by the listing means, before the new processing program is transmitted. If the type of the processing device indicated by the obtained device information is not compatible with the new processing program identified by the identifier, the warning means provides a warning in a suitable manner.

The device information obtaining means and the warning means are effective to prevent erroneous transmission of the new processing program to the processing devices with which the new processing program is not compatible, so that any problems which would arise from the above-indicated erroneous transmission can be avoided. Such problems may include malfunction of the processing devices, and generation of error signals or messages in the processing devices.

The listing means may be adapted to list all of the processing devices which are included in the communication system and which are connected to each other through the network. Alternatively, the listing means may be adapted to list only the processing devices which satisfy a predetermined condition relating to the types of the processing devices. In the latter case, the listing means may be adapted to select only the processing devices whose type or types is/are compatible with the new processing program to be transmitted by the transmitting means. In this instance, the warning means indicated above is not necessary. Where the warning means is provided, the erroneous transmission of the processing program is prevented by the operator who operates the selecting means.

The fourth object indicated above may be achieved according to an eighth aspect of the present invention, which provides a data storage medium accessible by a computer and storing a software program for operating the computer to function as the transmitting means, the listing means and the selecting means of the program transmitting device in the communication system according to any one of the fourth, fifth and sixth aspects of the present invention.

The fourth object may also be achieved according to a ninth aspect of this invention, which provides a data storage medium accessible by a computer and storing a software program for operating the computer to function as the transmitting means, the listing means, the selecting means, the device information obtaining means and the device classifying means of the program transmitting device in the communication system according to the above-indicated preferred form of the fourth, fifth and sixth aspects of the invention, or according to the seventh aspect of the invention.

The fourth object may also be achieved according to a tenth aspect of this invention, which provides a data storage medium accessible by a computer and storing a software program for operating the computer to function as the transmitting means, the listing means, the selecting means, the device information obtaining means and the warning means of the program transmitting device in the communication system according to the above-indicated preferred form of the fourth, fifth, sixth and seventh aspects of the invention.

The program transmitting device which is adapted to transmit the new processing program to each selected processing device may include a computer which functions as the transmitting means, the listing means and the selecting means, where appropriate, also as the device information obtaining means, device classifying means and/or warning means. In this case, the computer is operated according to an appropriate software program stored in a suitable data storage medium, so that the programmable storage area of the programmable ROM of each selected processing device can be programmed, with the received new processing program being newly written in the programmable storage area.

BRIEF DESCRIPTION OF THE DRAWINGS

The above and other objects, features, advantages, and technical and industrial significance of the present invention will be better understood by reading the following detailed description of presently preferred embodiments of this invention, when considered in connection with the accompanying drawings, in which:

FIG. 8 is a view illustrating an example of a screen view on a CRT provided in tee system, which includes a list of device information;

FIG. 9 is a view showing a displayed list of device information, when one of the processing devices is selected;

FIG. 10 is a view showing the displayed list of device information when all processing devices of the same type are selected;

FIG. 18 is a view illustrating a displayed list of device information according to another embodiment of this invention.

DETAILED DESCRIPTION OF THE PREFERRED EMBODIMENT

Figure 1:
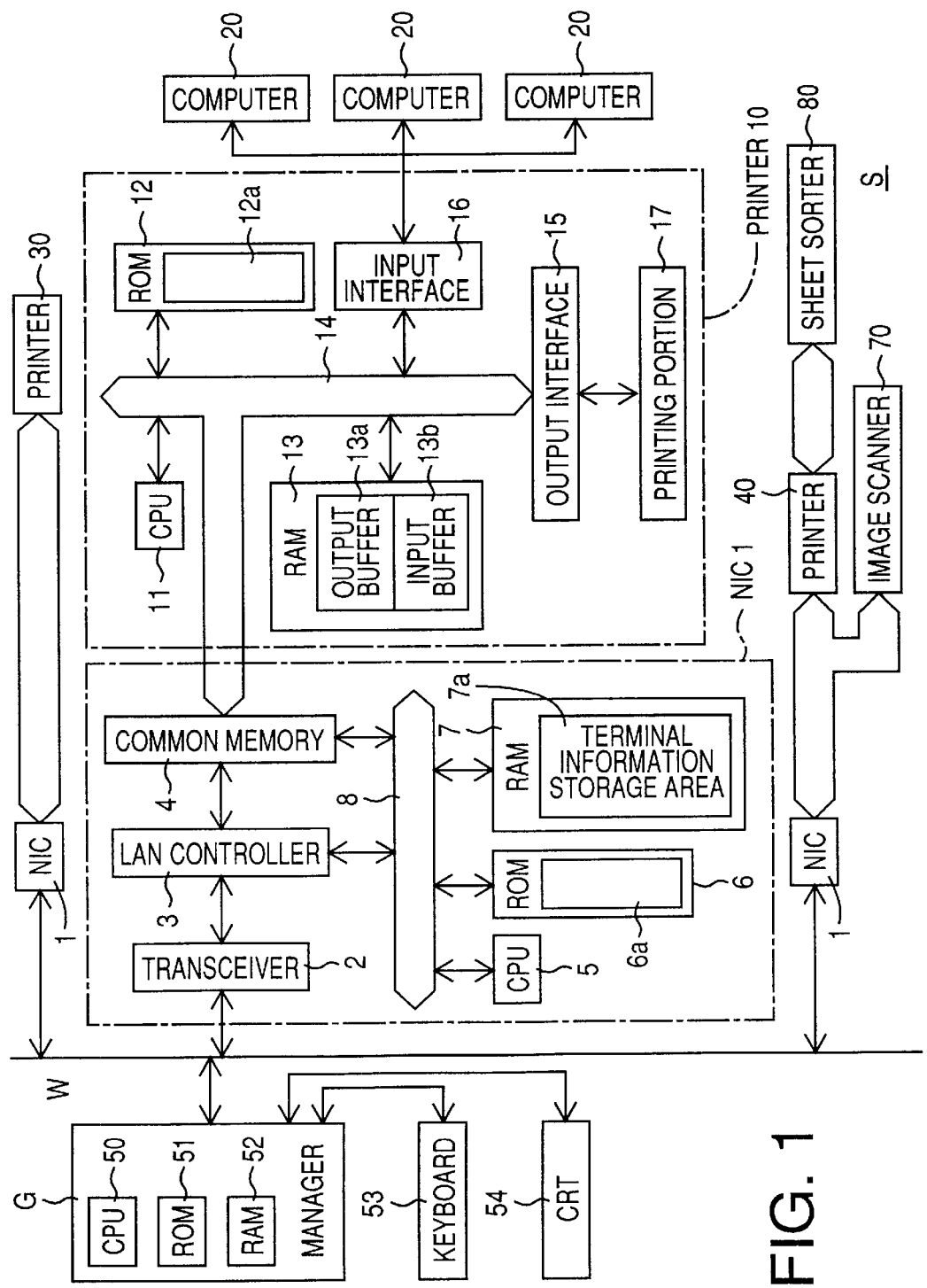
FIG. 1 is a block diagram showing a communication system constructed according to one embodiment of the present invention.

Referring first to the block diagram of FIG. 1, there is shown a communication system S constructed according to one embodiment of the present invention. The communication system S includes a manager G, a network W, a plurality of NICs 1, three printers 10, 30 and 40, a plurality of computers 20 connected to the printer 10, a color image scanner 70 connected in parallel to the printer 40, and a sheet sorter 80 connected in series with the printer 40. The manager G is a managing computer serving as a program output device and a program transmitting device. The network W is a telephone line or a LAN (local area network). The three NICs 1 are interface devices connected to respective terminal devices in the form of the three printers 10, 30, 40, which are of different types. As described below in detail, the communication system S is adapted such that firmwares used for the printers 10, 30, 40 can be managed by the manager G, by manipulation through a keyboard 53 and other input devices (not shown) such as a mouse, and by using a cathode ray tube (CRT) 54.

The manager G is a well know personal computer which incorporates a first information processor in the form of a CPU (central processing unit) 50, a ROM (read-only memory) 51 and a RAM (random-access memory) 52 and is connected to the above-indicated keyboard 53 and CRT (cathode ray tube) 54.

The NIC 1 connected to the printer 10 includes a transceiver 2 serving as replying means responsive to the manager G, a LAN controller 3, a common memory 4, a CPU (central processing unit) 5, a ROM (read-only memory) 6, a RAM (random-access memory) 7 and a bus 8. The ROM 6 is a programmable ROM in the form of a flash memory, for example, which includes a programmable portion in the form of a programmable storage area 6a that can be reprogrammed (hereinafter simply referred to as "programmed"). The RAM 7 includes a terminal information storage area 7a.

The printer 10 includes a second information processor in the form of a CPU (central processing unit) 11, a ROM (read-only memory) 12, a RAM (random-access memory) 13, a bus 14, an output interface 15, an input interface 16, and a printing portion 17. The ROM 12 is also a programmable ROM in the form of a flash memory, for example, which includes a programmable portion in the form of a programmable storage area 12a that can be programmed. The RAM 13 includes an output buffer 13a and an input buffer 13b. The printer 10 is connected to the NIC 1 through a connecting line 9 which is connected to the bus 14. The printer 10 is also connected to each of the three computers 20 through the input interface 16.

An operation of the communication system S will be briefly explained by reference to FIG. 1, with respect to the programming of the programmable storage area 12a of the programmable ROM 12 of the printer 10 and of the programmable storage area 6a of the programmable ROM 6 of the NIC 1 connected to the printer 10, by way of example.

The following description substantially applies to the programming of the ROMs of the printers 30 and 40 and the corresponding NICs 1. The three printers 10, 30, 40 and the corresponding NICs 1 will be referred to as "processing devices" where appropriate.

The CPU 50 of the manager G generates appropriate data to be transferred or transmitted to the printer 10 and/or the NIC 1 connected thereto, and transmit the generated data to the printer 10 and/or the corresponding NIC 1 through the network W. The data which are processed by the NIC 1 are transmitted to the NIC1 according to TFTP (trivial file transfer protocol). The data which are processed by the printer 10 are transmitted to the printer 10 through the NIC 1, according to LPR (line printer remote). Where the data need not be processed by the particular processing device, the data are transmitted according to a suitable protocol such as UDP (user datagram transfer protocol). The transceiver 2 of the NIC 1 demodulates the received data, and the demodulated data are transmitted to the bus through the LAN controller 3. The LAN controller 4, controls data transmission to and from the manager G through the network W.

Where the data are transmitted to the NIC 1 according to the TFTP, the CPU 5 processes the received data according to information stored in the ROM 6, while utilizing a temporary data storage function of the RAM 7. The CPU 5 replies to the manager G, by transferring or transmitting information on a result of the processing of the received data by the CPU 5, through the bus 8, LAN controller 3, transceiver 2 and network W.

Where the data are transmitted to the NIC 1 according to the LPR, the CPU 5 transmits the data to the printer 10 through the common memory 4 and the connecting line 9. In this case, the received data are once stored in the common memory 4, and the CPU 5 sends an interruption signal to the CPU 11 through a signal line (not shown), to request the CPU 11 to process the data to be received from the common memory 4. The operations of the CPU 5 upon reception of the data from the manager G are performed according to a suitable control program stored in the ROM 6.

The common memory 4 is a memory for temporarily storing data for both the NIC 1 and the printer 10, when data processing is effected by the NIC 1 and the printer 10.

When the data (e.g., data transmitted from the manager G according to the LPR) are transmitted or transferred from the NIC 1 through the connecting line 9 to the printer 10 to be processed by the printer 10, the CPU 11 receives the transmitted data through the bus 14, and processes the received data according to information stored in the ROM 12, while utilizing a temporary data storage function of the RAM 13. Then, the CPU 11 relies to the NIC 1, by transmitting information on a result of the processing of the received data by the CPU 11, through the bus 14, connecting line 9 and common memory 4. The operations of the CPU 5 upon reception of the data from the NIC 1 are performed according to a suitable control program stored in the ROM 12.

The NIC 1 transmits the information on the result of processing received from the printer 10, to the manager G through the network W.

The printer 10 receives through the input interface 16 output data such as image data from each of the three computers 20. The thus received output data of the computer 20 are temporarily stored in the input buffer 13b through the bus 14, and are then processed by the CPU 11 into printing data usable by the printing portion 17, according to a control program stored in the ROM 12. The thus obtained printing data are temporarily stored in the output buffer 13a of the RAM 13, from which the printing data are supplied to the printing portion 17 through the bus 14 and the output interface 15, so that the printing portion 17 operates to perform a printing operation according to the printing data.

The communication system S may include one or more computers other than the computers 20 shown in FIG. 1. In this case, the printer 10 receives output data such as image data from any one of those other computers through the network W and the NIC 1 connected to the printer 10, so that the received data are stored in the input buffer 13b, so that the data are processed into printing data, to operate the printing portion 17 according to the printing data, in the same manner as described above.

In the present embodiment, the printers 10, 30 and 40 included in the communication system S are of different types but are connected to the respective NICs 1 of the same configuration. For instance, the printing portions 17 of the printers 10, 30 and 40 have different printing mechanisms. Further, or alternatively, the printers 10, 30 and 40 are adapted to accept output data of the computers in different formats. The ROM 12 of each of the printers 10, 30, 40 stores device information identifying the particulars of each specific printer. The communication system S further includes other printers connected to the network W through respective NICs which are different in configuration to the NICs 1 for the printers 10, 30, 40.

The programmable storage areas 6a, 12a of the programmable ROMs 6, 12 store processing programs such as firmwares used for processing data received by the NIC 1 or printer 10. Since these storage areas 6a, 12a are programmable, the printer 10 can be upgraded by programming the programmable storage areas 6a, 12a, that is, by replacing the originally or currently stored processing programs (firmwares) with new processing programs. There will be described operations for programming the programmable storage areas 6a, 12a of the programmable ROMs 6, 12.

Figure 2:
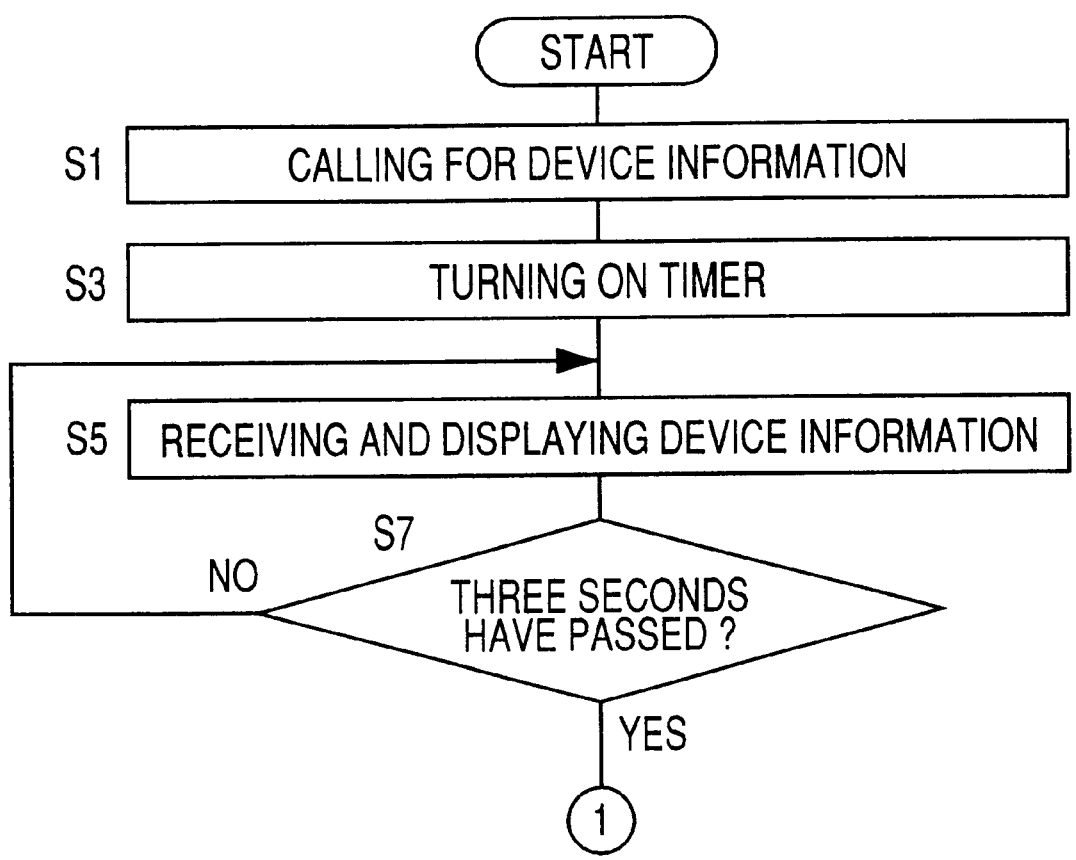
FIGS. 2–5 are flow charts illustrating an upgrading routine executed by a manager provided in the communication system of FIG. 1, to program programmable ROMs used for selected processing device or devices such as printers in the communication system, for upgrading the selected device.

Initially, a printer upgrading application is called in the manager G, so that the CPU 50 initiates an upgrading routine illustrated in the flow charts of FIGS. 2–5. As shown in FIG. 2, the routine is initiated with step S1 in which a broadcast packet is transmitted, according to the UDP, through the network W to all of the printers connected to the network W, to call for the device information of each printer. Then, the control flow goes to step S3 to start or turn on a timer which is capable of measuring a time lapse of at least three seconds. Step S3 is followed by step S5 to receive the device information from each printer through the network W and display the received device information on the CRT 54. Then, the control flow goes to step S7 to determine whether three seconds have passed. If a negative decision (NO) is obtained in step S7, the control flow goes to step 5. Steps S5 and S7 are repeatedly implemented until an affirmative decision (YES) is obtained in step S7, that is, until three seconds have passed after the timer has been turned on. Thus, the manager G receives the device information for a period of three seconds.

Upon reception of the broadcast packet from the manager G, the printer 10 (and each of the other printers) initiates a device information obtaining routine (not shown) to obtain device information of the NIC 1 to which the printer 10 is connected. The device information of the NIC 1 includes the device name of the NIC 1 (NIC device name) and data (NIC version) indicative of the version of the firmware stored in the ROM 6 of the NIC 1. After waiting for a time in the order of a few or several msecs. corresponding to a random number, the printer 10 sends back the device information of the NIC 1 as well as the device information of the printer 10 itself, to the manager G. The device information of the printer 10 includes a device class, a device name, a device status and a firmware version of the printer 10. Each of the printers (e.g., printer 10) may be adapted to obtain and store the device information of the corresponding NIC (NIC 1 for the printer 10) when the printer is initially turned on with power application thereto. Further, the printer 10, for example, may be adapted to store the device information of some or all of the other printers connected to the network W and the device information of the corresponding NICs, so that the printer 10 sends to the manager G the device information of those other printers and their NICs as well as the device information of the printer 10 itself and the corresponding NIC 1.

Figure 7:
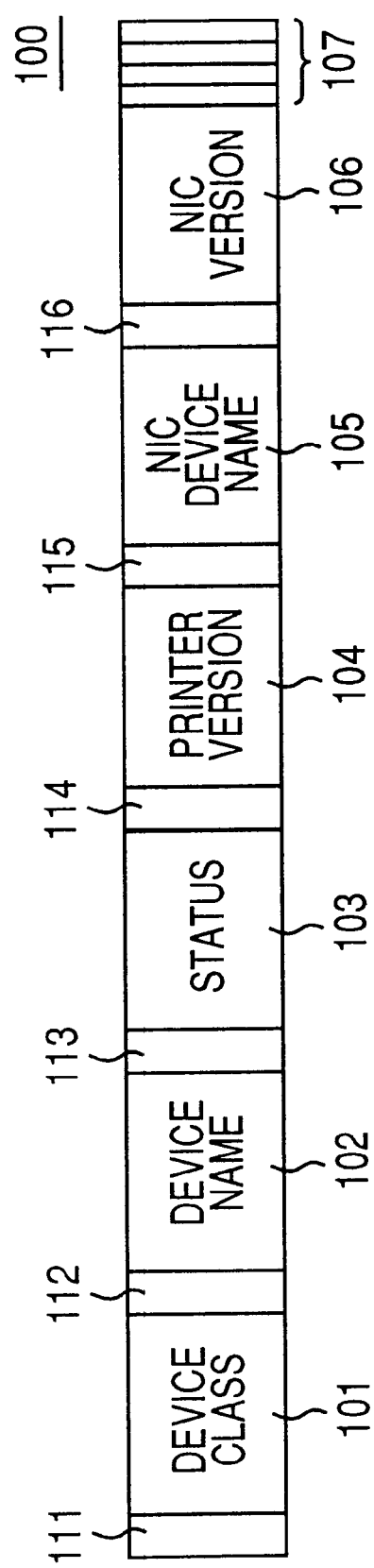
FIG. 7 is a view illustrating a format of device information to be transmitted from the selected device.

Thus, the manager G receives the device information through the network W from the individual printers at different times according to the random number generation. In step S5 of the upgrading routine executed by the manager G, the device information is displayed on the CRT 54. FIG. 7 illustrates the format of device information 100 received from the printer 10, and FIG. 8 shows an example of a screen view 200 on the CRT 54, which includes a device list 201 prepared according to the device information 100 received from the printer 10 and the device information received from the other printers.

As indicated above and as shown in FIG. 7, the device information 100 includes a device class 101 indicative of the class (e.g., laser printer or color printer) of the appropriate printer, a device name 102 indicative of the type of the appropriate printer, a status 103 indicative of the present state of the appropriate printer, and a printer version 104 indicative of the firmware version of the appropriate printer, a NIC device name 105 indicative of the type of the NIC corresponding to the appropriate printer, a NIC version 106 indicative of the firmware version of the NIC, and an IP address 107 accorded to the appropriate printer. These device class 102, device name 102, status 103, printer version 104, NIC device name 105 and NIC version 106 are preceded by respective leaders indicative of the data lengths, namely, device class length 111, device name length 112, status length 113, printer version length 114, NIC device name length 115 and NIC version length 116.

As also shown in FIG. 7, the device list 201 displayed on the screen of the CRT 54 in step S5 according to the device information 100 includes horizontal lines of device information of the individual printers, which are arranged in the vertical direction, together with icons corresponding to the classes of the printers indicated by the device class 101. The line of device information of each printer, which is located to the right of the corresponding icon, consists of the device class, device name (indicated by the device name 102), device status (indicated by the device status 103), printer's firmware version (indicated by the printer version 104), NIC device name (indicated by the NIC device name 105), NIC firmware version (indicated by the NIC version 106), and IP address (indicated by the IP address 107).

It is noted that the device list 201 also includes device information of the color image scanner 70, which is also considered to be a processing device which reads a color image according to a certain firmware. The firmware version of the color image scanner 70 is indicated in the column of the printer's firmware version (corresponding to the printer version 104), as shown in FIG. 8. It is also noted that the processing devices (printers, etc.) of the same type are connected to the respective NICs of the same type.

The display screen view 200 includes an array of control button areas located above the device list 201. The array of control button areas includes a PRINTER FIRMWARE UPGRADE button 202, a NIC FIRMWARE UPGRADE button 201, a SELECT ALL SAME TYPE DEVICES button 204, and an END button 205. These buttons 202, 203, 204, 204 and 205 may be "pressed" by clicking a mouse while a cursor is located within the appropriate button area. The PRINTER FIRMWARE UPGRADE button 202 is pressed to upgrade the firmware of any printer or color image scanner 70, for example, by programming the programmable storage area 12a of the programmable ROM 12 of the printer 10. The NIC FIRMWARE UPGRADE button 203 is pressed to upgrade the firmware of any NIC, for example, by programming the programmable storage area 6a of the programmable ROM 6 of the NIC 1 for the printer 10. The SELECT ALL SAME TYPE DEVICES button 204 is pressed to upgrade the firmwares of all of the devices of the same type. The END button 205 is pressed to terminate the firmware upgrading operation.

The icons included in the device list 201 also function as buttons, which may be "pressed" by clicking the mouse while the cursor is located within the area of the appropriate icon.

Figure 3:
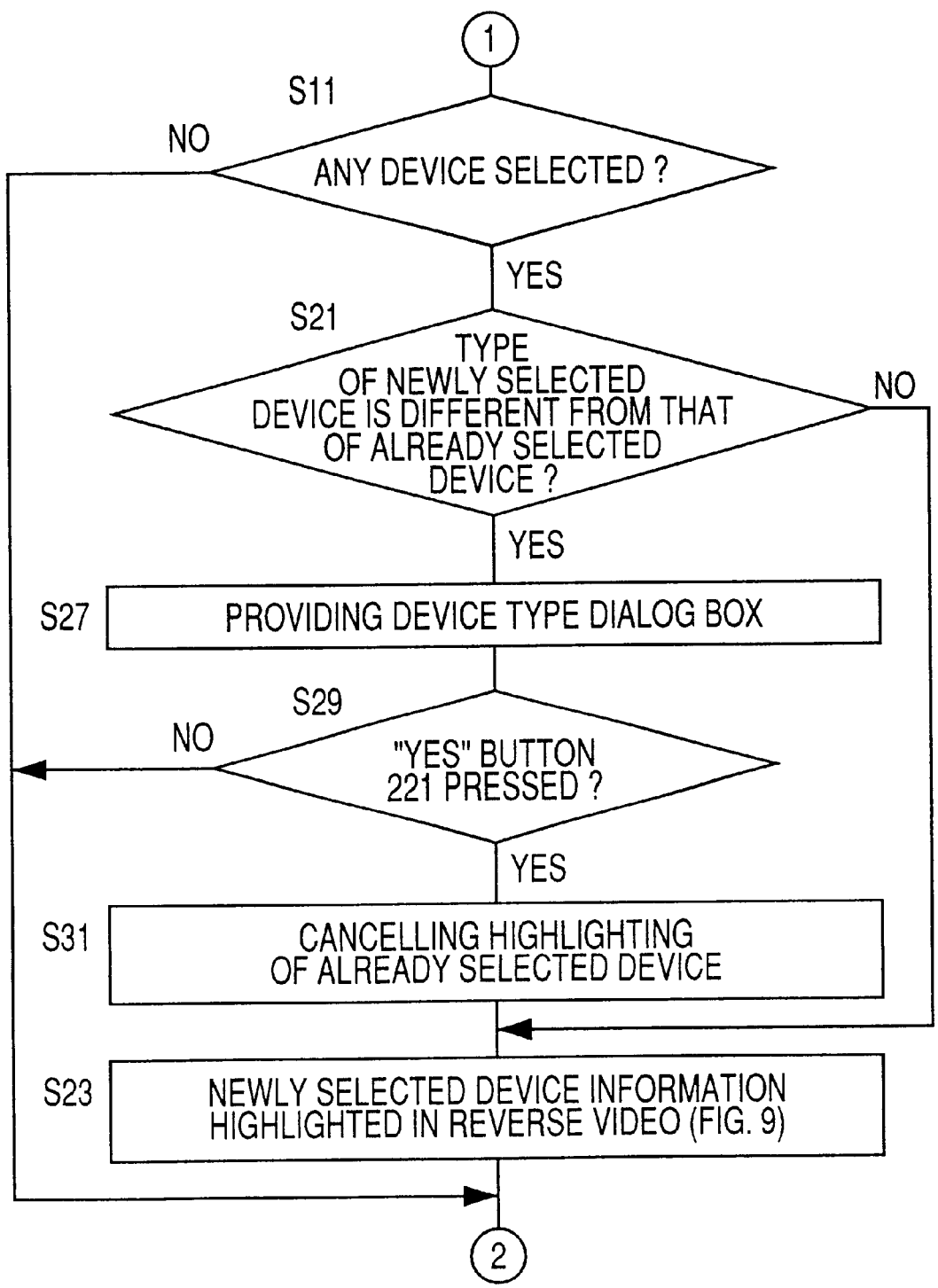
Figure 4:
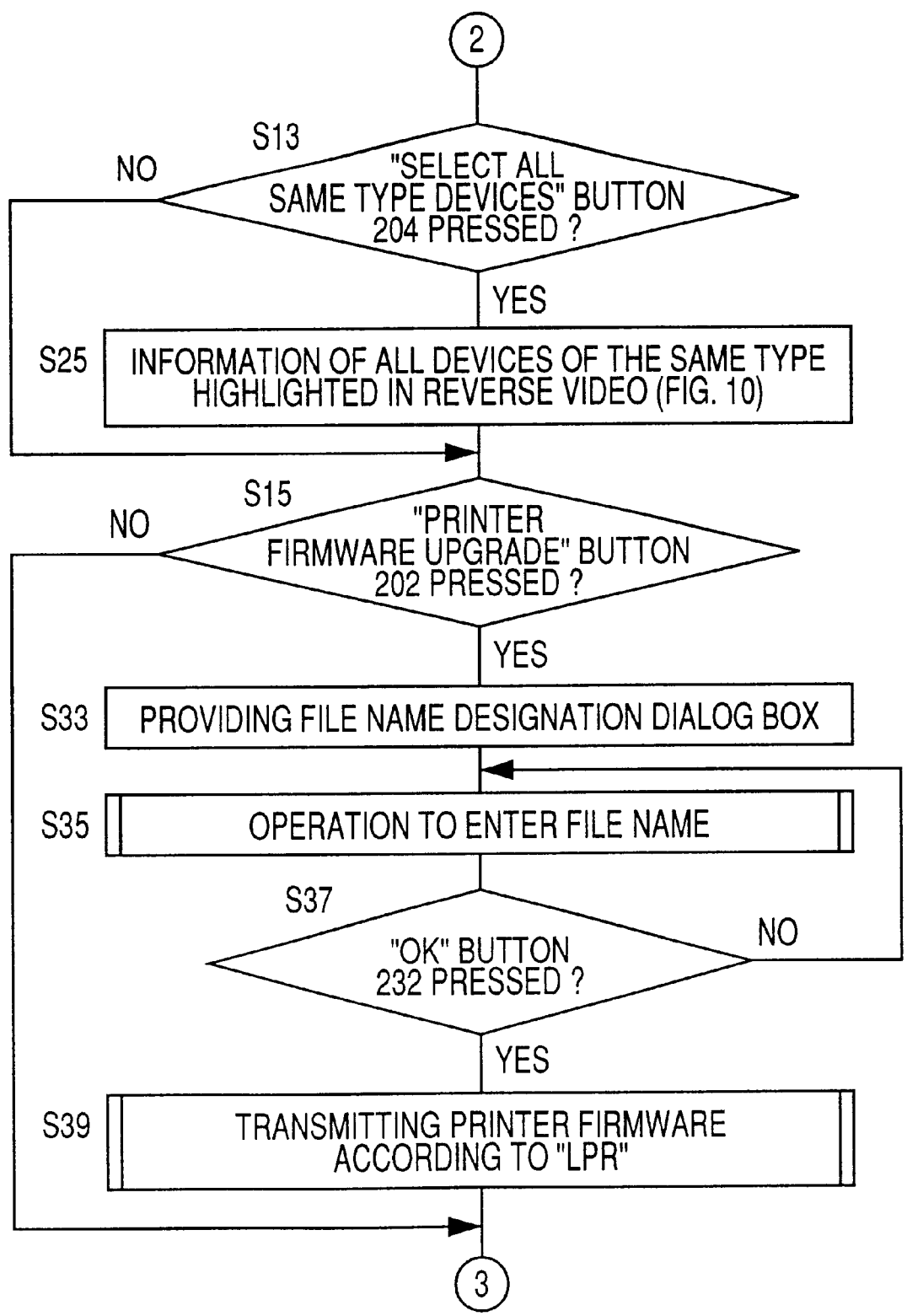
Figure 5:
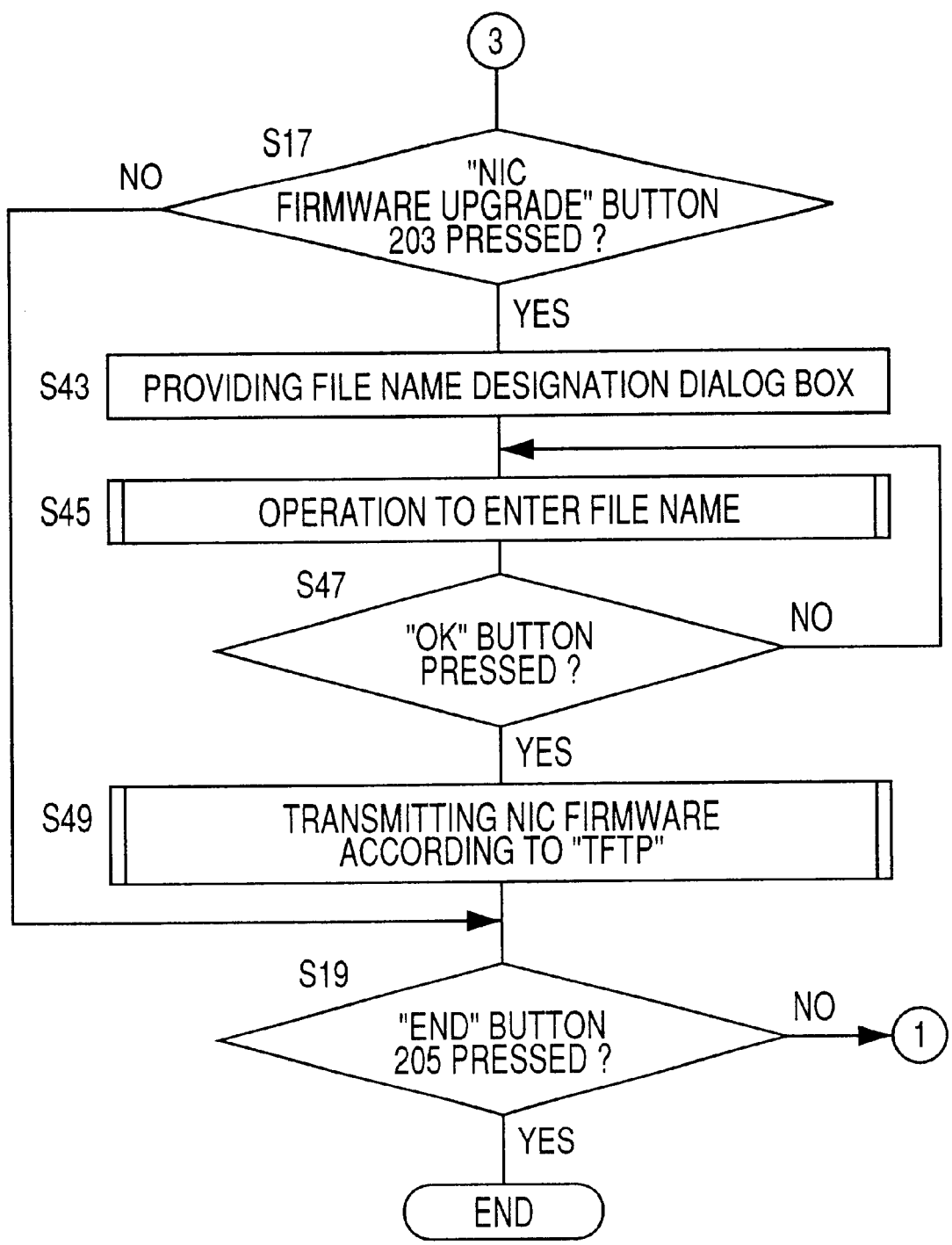

Referring back to the flow chart of FIGS. 2–5, the control flow goes to step S11 of FIG. 3 if the affirmative decision (YES) is obtained in step S7. In this condition, the display screen view 200 includes the device list 201 as shown in FIG. 8. Step S11 is provided to determine whether any processing device is selected by clicking the mouse with the cursor being located within the area of the appropriate icon in the device list 201. If a negative decision (NO) is obtained in step S11, the control flow goes to step S13 to determine whether the SELECT ALL SAME TYPE DEVICES button 304 has been pressed. If a negative decision (NO) is obtained in step S13, the control flow goes to step S15 to determine whether the PRINTER FIRMWARE UPGRADE button 202 has been pressed. If a negative decision (NO) Is obtained in step S15, the control flow goes to step S17 to determine to determine whether the NIC FIRMWARE UPDATE button 203 has been pressed. If a negative decision (NO) is obtained in step S17, the control flow goes to step S19 to determine whether the END button 205 has been pressed. If a negative decision (NO) is obtained in step S19, the control flow goes back to step S11. Steps S11, S13, S15, S17 and S19 are repeatedly implemented until an affirmative decision (YES) is obtained in any of those steps, that is, until any one of the buttons 202–205 is pressed or any one of the icons in the device list 201 is "clicked".

Usually, the user or operator of the manager G viewing the display screen view 200 initially selects the desired processing device or devices, by clicking the corresponding icon or icons in the device list 201. In this case, an affirmative decision (YES) is obtained in step S1, and the control flow goes to step S21 to determine whether the type of the newly selected processing device is different from that of the already selected processing device. Where a certain one of the processing devices is selected for the first time, a negative decision (NO) is obtained in step S21, and the control flow goes to step S23 in which the line of information of the selected device is displayed in reverse video with white characters on the black background. If the uppermost icon in the device list 201 is "clicked" to select the laser printer (device name: 1660, NIC device name: 2010), the uppermost line of information of the laser printer is highlighted in reverse video, as indicated in FIG. 9. Then, the control flow goes to step S13.

If the SELECT ALL SAME TYPE DEVICES button 204 is pressed in this condition, an affirmative decision (YES) is obtained in step S13, and step S25 is implemented to highlight the lines of information of all processing devices of the same type as that of the selected device. If the button 204 is pressed when the uppermost line of information is highlighted in reverse video, as indicated in FIG. 9, the lines of information of all of the laser printers of the same type as that of the uppermost line of information are highlighted in reverse video, as indicated in FIG. 10. Thus, all of the processing devices of the same type can be selected with the button 204, without clicking the icons of those processing devices.

Figure 11:
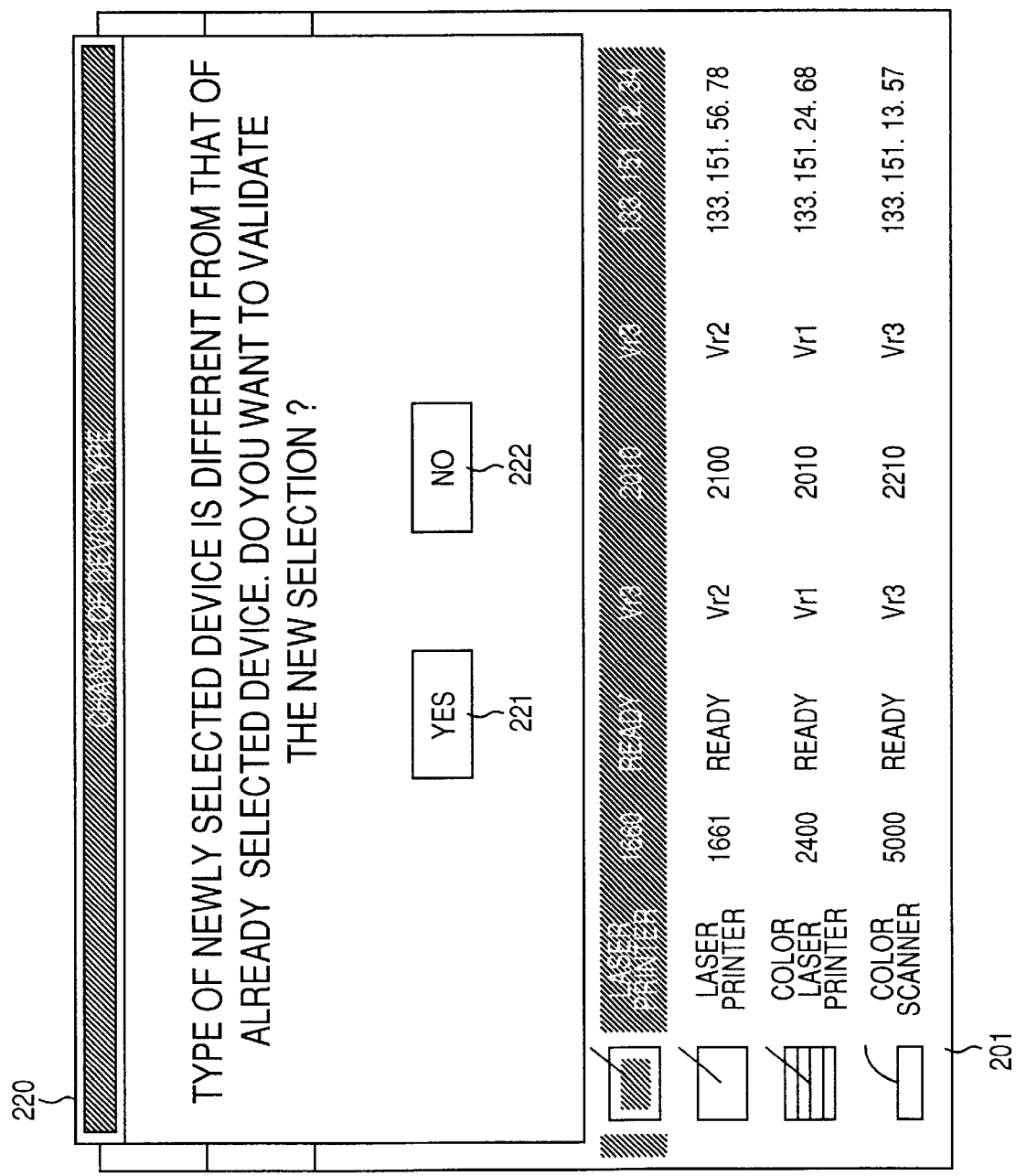
FIG. 11 is a view showing an example of a displayed dialog box including a prompting message in the step of selecting a desired one of the devices.

However, all or some of the processing devices of the same type can be selected by clicking the corresponding icons one after another. In the example of FIG. 10, the uppermost or first icon, the second icon and the fourth icon in the device list 201 are clicked. If two or more processing devices of different types are selected, a firmware that is used to upgrade the processing device of one of those different types is not generally compatible with the processing device or devices of the other type or types. Further, the selection of the processing devices of different types would cause another problem when the SELECT ALL SAME TYPE DEVICES button 204 is pressed. To avoid these problems, steps S21, S27, S29 and S31 are provided. Described more specifically, an affirmative decision (YES) is obtained in the above-indicated step S21 if the type of the newly selected processing device is different from that of the already selected processing device. In this case, the control flow goes to step S27 to open a DEVICE TYPE dialog box 220 over a portion of the display screen view 200, as shown in FIG. 11, for prompting the user or operator of the manager G to either maintain the already selected type (invalidate the newly selected type) or change the type to the newly selected type (validate the newly selected type). The dialog box 220 contains a prompting message "TYPE OF NEWLY SELECTED DEVICE IS DIFFERENT FROM THAT OF ALREADY SELECTED DEVICE. DO YOU WANT TO VALIDATE THE NEW SELECTION?". The dialog box 220 also contains an YES button 221 used to validate the newly selected type (newly selected processing device), and a NO button 222 to maintain the already selected type (invalidate the newly selected type). If the YES button 221 is pressed, an affirmative decision (YES) is obtained in step S29, and the control flow goes to step S31 to cancel the already selected type and the reverse video highlighting of the line of information of the already selected device. Then, step S23 is implemented to validate the newly selected type and highlight the line of information of the newly selected device.

If the NO button 222 in the DEVICE TYPE dialog box 220 is pressed, a negative decision (NO) is obtained in step S29, and the control flow goes to step S13. In this case, the already selected processing device (already selected type) is maintained, and the newly selected processing device (type) is invalidated. As a result of pressing the YES button 221 or the NO button 222, the dialog box 220 is closed, and the entire view of the display screen view 200 is provided.

Where the type of the newly selected processing device is the same as that of the already selected processing device, the negative decision (NO) is obtained in step S21, and the control flow goes to step S23, while skipping steps S27, S29 and S31. In this case, the line of information of the newly selected device is also highlighted in reverse video. Thus, the two or more processing devices of the same type can be selected as the devices to be upgraded.

Figure 12:
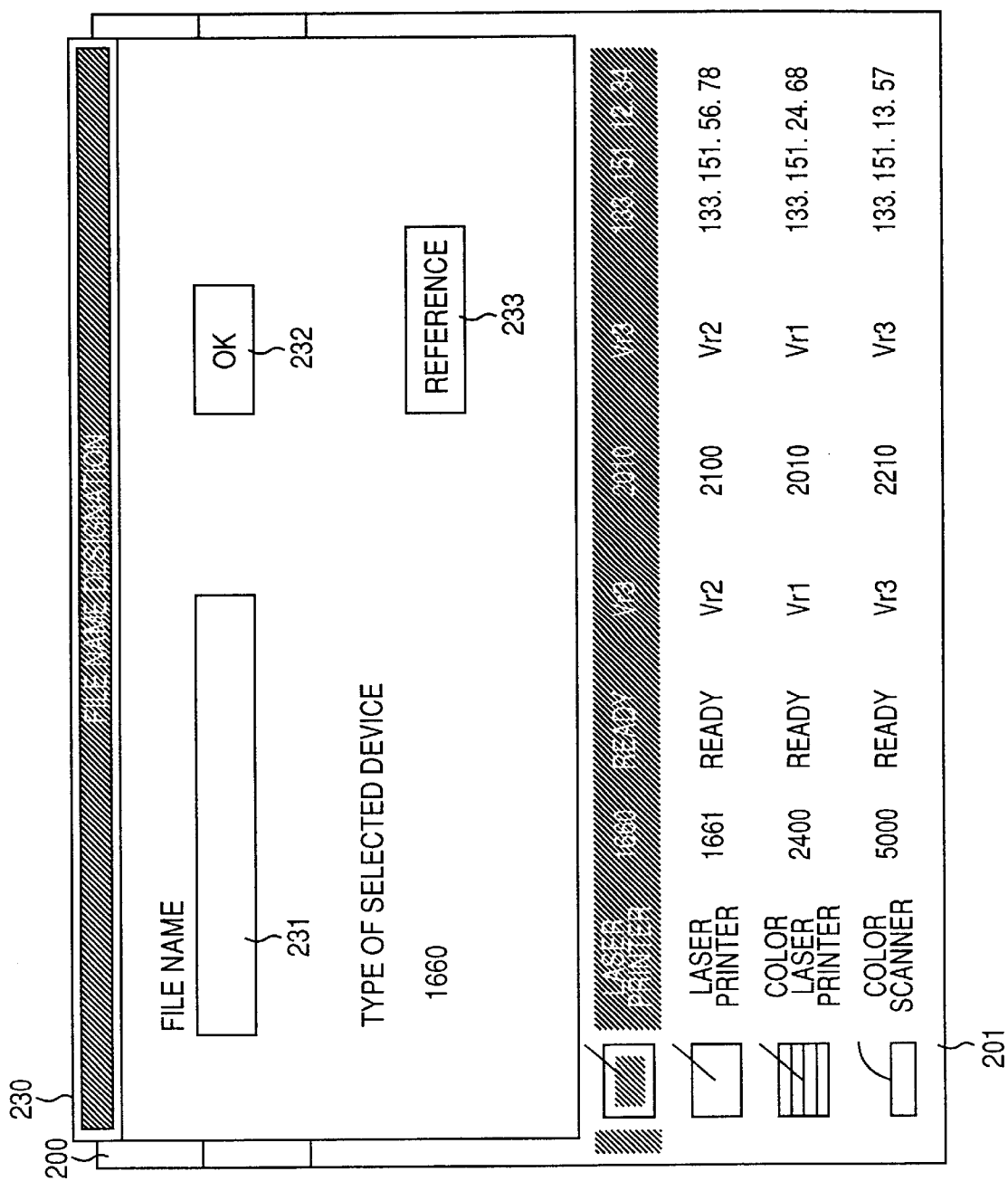
FIG. 12 is a view showing an example of a displayed dialog box for prompting designation of a file name.

After the desired processing device or devices has/have been selected, the operator of the manager G presses the PRINTER FIRMWARE UPGRADE button 202 or NIC FIRMWARE UPGRADE button 203. If the button 202 is pressed, an affirmative decision (YES) is obtained in step S15, and the control flow goes to step S33 to open a FILE NAME DESIGNATION dialog box 230 over a portion of the display screen view 200, as shown in FIG. 12. The dialog box 230 contains: an indication of the type of the selected processing device or devices; a FILE NAME entry area 231; an OK button 232; and a REFERENCE button 233.

After the FILE NAME DESIGNATION dialog box 230 has been opened in step S33, the control flow goes to step S35 to permit an operation to designate or enter a file name of a firmware that is used to upgrade the selected processing device or devices. This operation is permitted until the OK button 232 is pressed, that is, until an affirmative decision (YES) is obtained in step S37. Where the file name of a desired firmware is designated by the operator through the keyboard 5t, the CPU 50 of the manager G operates to provide an indication of this file name in the FINE NAME entry area 231 in the dialog box 230. If the REFERENCE button 233 is pressed, a reference dialog box (not shown) is opened over the dialog box 230. This reference dialog box lists file names of firmwares which are stored in the ROM 51 or other memories or servers connected to the manager G via a communication line. A desired one of the firmwares whose file names are indicated in the reference dialog box can be selected by the operator using a cursor key and a function key on the keyboard 53. In this case, too, the file name of the selected firmware is indicated in the FINE NAME entry area 231.

After the file name of the deoired firmware has been designated and indicated in the entry area 231, the OK button 233 is pressed by the operator. As a result, an affirmative decision (YES) is obtained in step S37, and the control flow goes to step S39 in which the firmware whose file name has been designated is transmitted through the network W according to the LPR, as described below, so that the firmware is processed in the selected processing device such as the printer 10, for example. After the operation in step S39 is completed, the FILE NAME dialog box 230 is closed, and the entire view of the display screen view 200 is provided. The control flow then goes to step S17.

When the NIC FIRMWARE UPGRADE button 203 is pressed, an affirmative decision (YES) is obtained in step S17, and the control flow goes to step S43 in which a dialog box similar to the dialog box 230 shown in FIG. 12 is opened. Step S43 is followed by step S45 similar to the step S35. When an OK button in the dialog box is pressed, an affirmative decision (YES) is obtained in step S47, and the control flow goes to step S49 in which the firmware whose file name has been designated is transmitted through the network W according to the TFTP, as described below, so that the firmware is processed in the selected NIC (selected processing device). After the operation in step S49 is completed, the dialog box opened in step S43 is closed, and the control flow goes to step S19 to determine whether the END button 205 has been pressed. If the button 205 is pressed, an affirmative decision (YES) is obtained in step S19, and the upgrading routine of FIGS. 2–5 is terminated.

Figure 6:
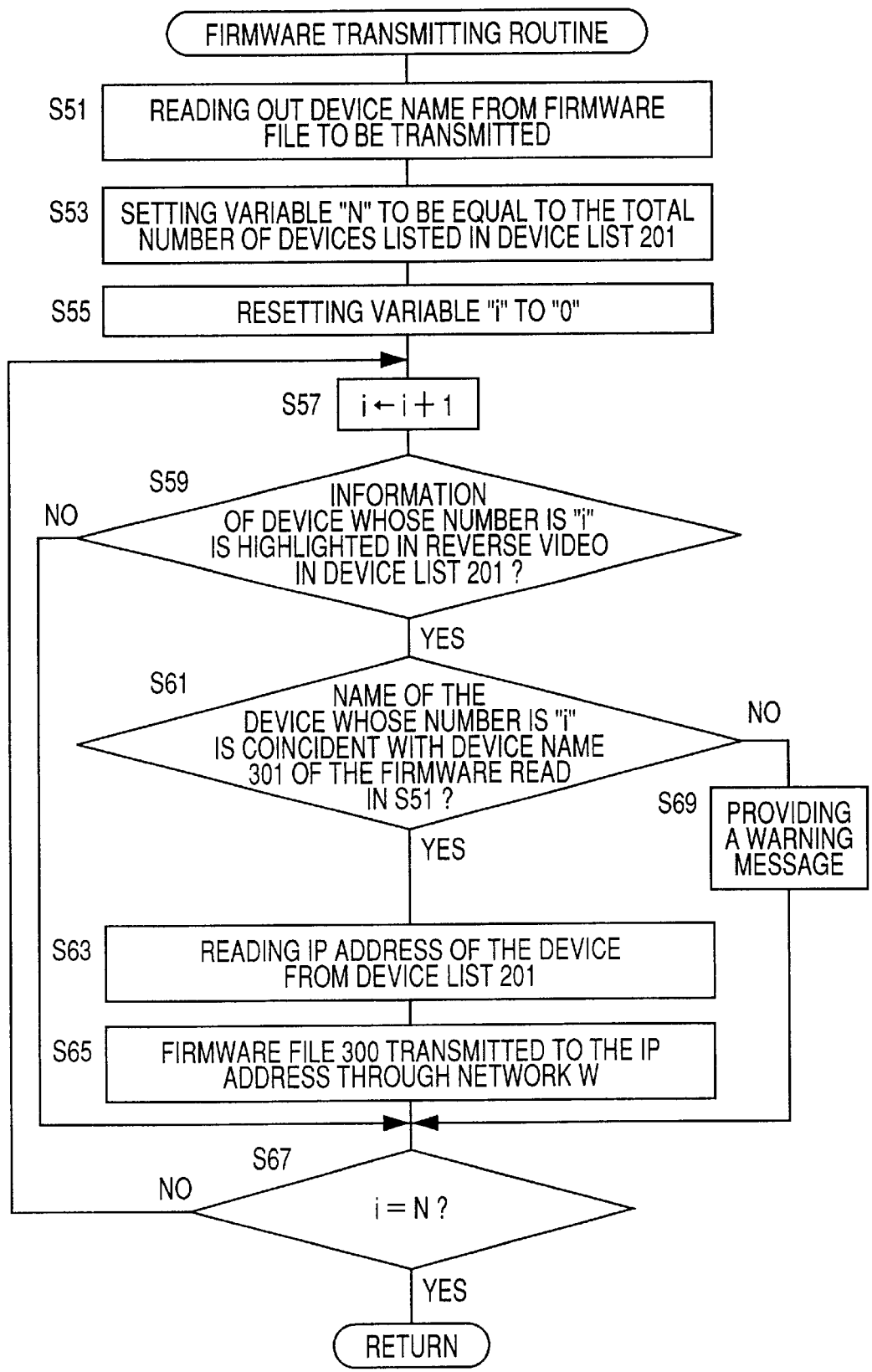
FIG. 6 is a flow chart illustrating an operation to transmit a firmware in steps S39 and S49 of the flow chart of FIGS. 4 and 5.
Figure 13A:
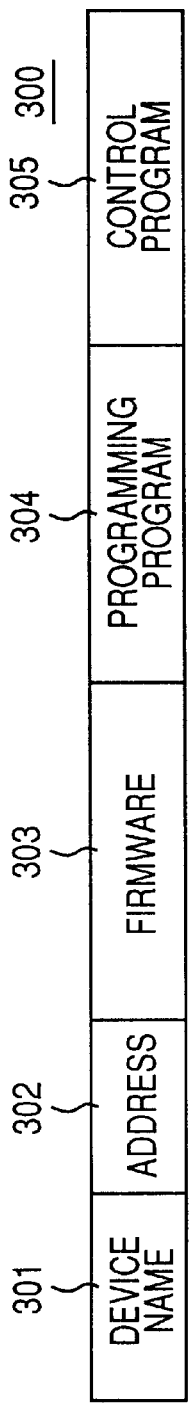
FIGS. 13A and 13B are views illustrating the format of a firmware file to be transmitted.

The operation performed in step S39 or S49 is illustrated in the flow chart of FIG. 6. Initially, step 951 is implemented to read out the device name from the file of the firmware to be transmitted. An example of the firmware file is shown in FIG. 13A, as a firmware file 300. This firmware file 300 consists of: an identifier in the form of a device name 301 indicating the name of the processing device compatible with the firmware in question; an address 302 indicating the address of the programmable ROM (e.g., ROM 12 of the printer 10, or ROM 6 of the NIC 1) at which the firmware is stored; the firmware 303 per se; a programming program 304 for programming the programmable storage area of the ROM (e.g., programmable storage area 6a or 12a), namely, for writing the firmware 303 in that programmable storage area; and a control program 305 for copying the programming program 304 into the RAM, as described below.

In step S51, the device name 301 is read out from the firmware file 300 whose name has been designated in step S35 or S45. Step S51 is followed by step S53 in which a variable "N" is set to be equal to the total number of the processing devices listed in the device list 201. Then, step S55 is implemented to reset a variable "i" to 0. Then, the control flow goes to step S57 to increment the variable "i", and to step S59 to determine whether the line of information of the device whose number (as counted from the top of the device list 201) is equal to the current value of the variable "i" is highlighted in reverse video in the device list 201. If an affirmative decision (YES) is obtained in step S59, the control flow goes to step S61 to determine whether the name of the device whose number is equal to the value of the variable "i" is coincident with the file name 301 read in step S51.

If an affirmative decision (YES) is obtained in step S61, the control flow goes to step S63 read out the IP address from the device list 201, and step S65 in which the firmware file 300 is transmitted through the network W to the IP address, that is, to the device whose number is equal to the value of the variable "i". In step S65, the firmware file 300 including the firmware 303 to be written in the programmable storage area 6a of the ROM 6 of the NIC 1 is "i" transmitted according to the TPTP, while the firmware file 300 including the firmware 303 to be written in the programmable storage area 12a of the ROM 12 of the printer 10 is transmitted according to the LPR.

Figure 13B:
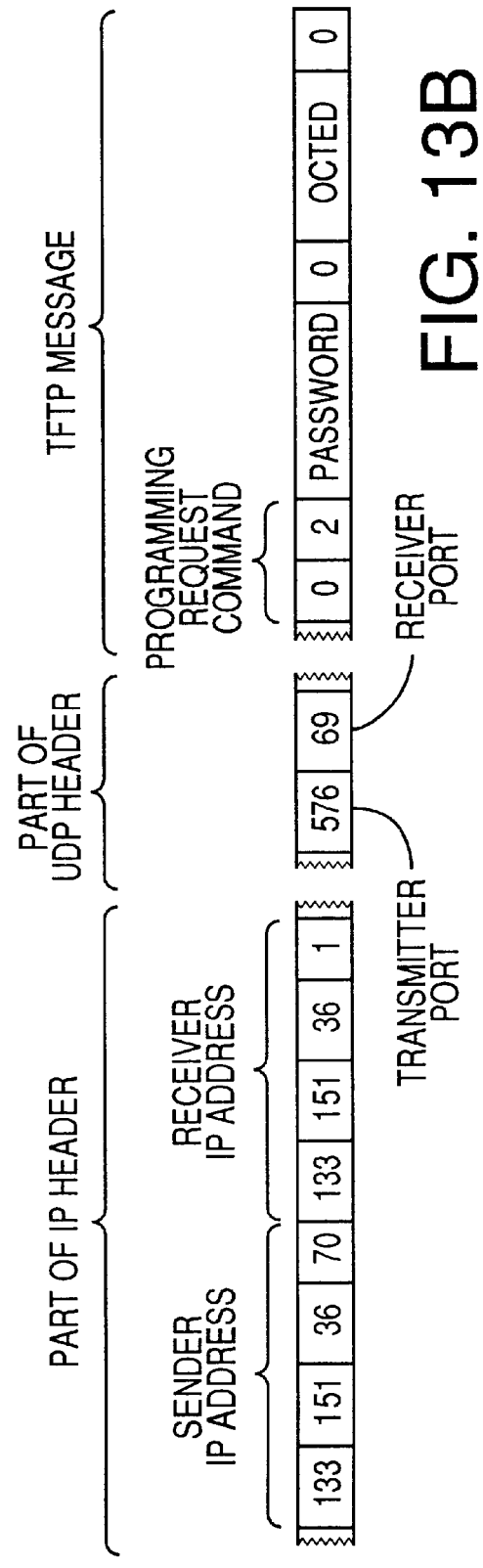

Transmission parameters of the TFTP includes a parameter indicative of PUT or GET (transmission or reception), an IP address of the receiver, a pass name of the firmware file at the transmitter, and a pass name of the firmware file at the receiver. However, the NIC 1 does not have a file system, and therefore the pass name of the firmware file at the receiver does not have a significance. In view of this, the pass name of the firmware file at the receiver is replaced by a pass word which is inherent in the manager G, as shown in FIG. 13(B). An advantage of this pass word will be described.

Referring back to the flow chart of FIG. 6, step S65 is followed by step S67 to determine whether the current value of the variable "i" is equal to "N". If a negative decision (NO) is obtained, the control flow goes back to step S57 to increment the variable "i", so that the subsequent steps are implemented for the device whose number is equal to the value of the variable "i". If the line of information of the device in question is not highlighted in reverse video in the device list 201, a negative decision (NO) is obtained in step SS9, and the control flow goes to step step S67 while skipping steps S67, S63 and S65. If the current value of the variable "i" is not equal to "N", the variable "i" is again incremented in step S57. Steps S57–S64 are repeatedly implemented until the value of the variable "i" reaches "N", namely, until an affirmative decision (YES) is obtained in step S67. If the affirmative decision is obtained in step S67 in step S39 of FIG. 4, the control flow goes to step S17 of FIG. 5. If the affirmative decision is obtained in step S67 in step S49 of FIG. 5, the control flow goes to step S19.

Figure 14:
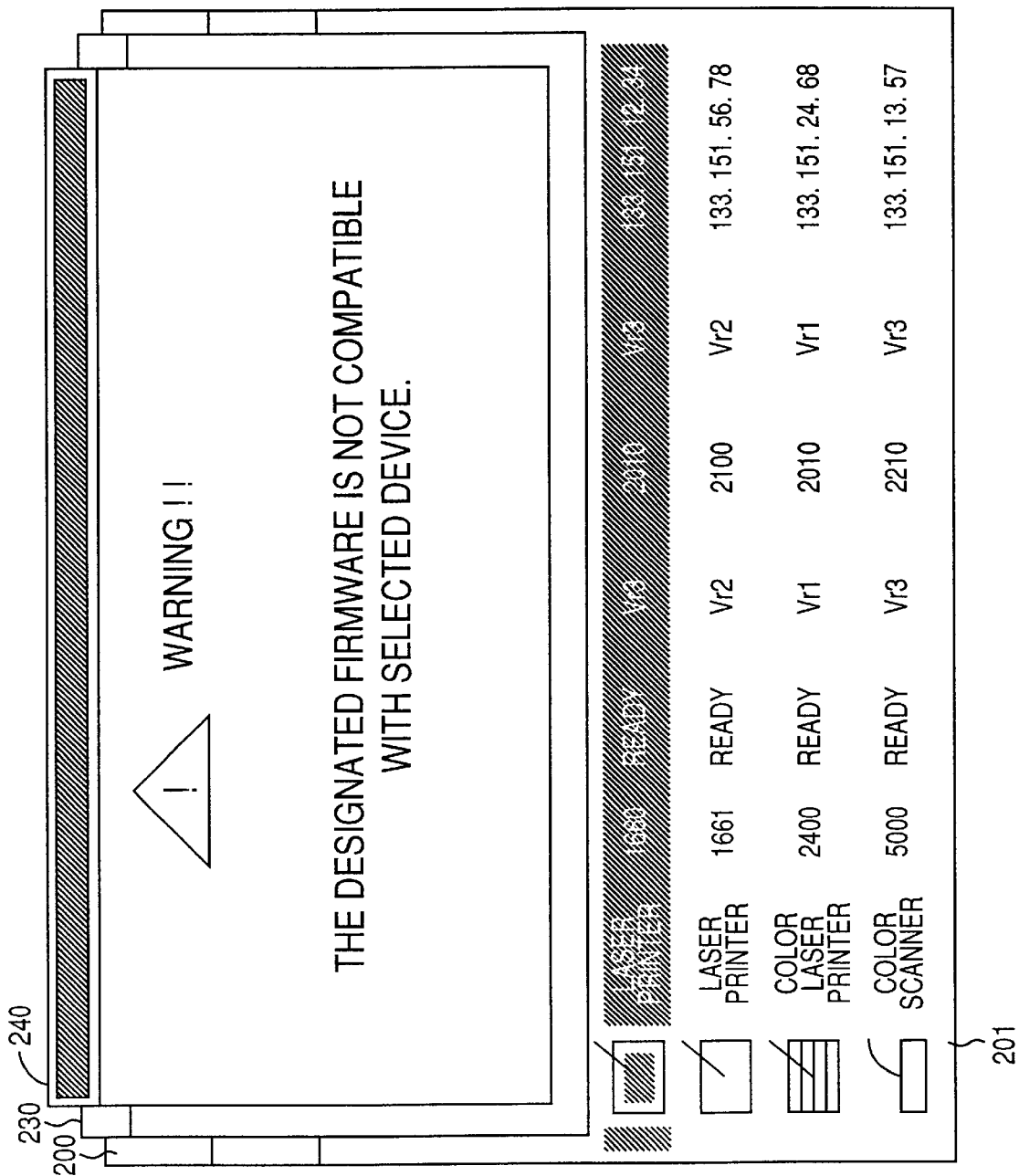
FIG. 14 is a view showing an example of a displayed warning message provided when the transmitted firmware is not compatible with the selected printer.

Thus, the firmware file 300 including the firmware 303 which has been designated in step S35 or S45 is transmitted to all of the selected processing devices whose lines of information are highlighted in the device list 201, or to the NICs connected to the selected processing devices. If the name of the processing device whose number is equal to the value of the variable "i" is not coincident with the device name 301 of the firmware read in step S51, a negative decision (NO) is obtained in step S61, and the control flow goes to step S69 to provide a warning message 240 over the FILE NAME DESIGNATION dialog box 230 which is still open (during implementation of step S39 or S49), as shown in FIG. 14. For instance, the warning message 240 reads "THE DESIGNATED FIRMWARE IS NOT COMPATIBLE WITH THE SELECTED DEVICE". In this event, steps S63 and S65 are not implemented, and the firmware file 300 is not transmitted. Step S65 is followed by step S67. Thus, steps S61 and S69 prevent erroneous transmission of the firmware file 300 whose firmware 303 is not compatible with the selected device.

As described above the manager G is adapted to provide the device list 201 which lists the processing devices from which the device information 100 have been received. The manager G is further adapted to permit the selection of the desired processing devices to which the firmware file 300 is transmitted. The selection of the two or more processing devices may be achieved by sequentially selecting the corresponding icons in the device list 201, or pressing the SELECT ALL SAME TYPE button 204 provided in the display screen view 200. Accordingly, the desired processing devices which are to be upgraded by programming the programmable ROMs can be easily and efficiently selected by the operator of the manager G, through the keyboard 53 and the CRT 54, so that the operating efficiency of the communication system S as a whole is significantly improved. In addition, the manager G is arranged to provide the warning message 240 if the firmware 303 included in the firmware file 300 to be transmitted is not compatible with the selected processing device. More importantly, the manager G is arranged to prevent the transmission of that firmware file 300 to the selected processing device if the firmware 303 included in the firmware file 300 is not compatible with the processing device. Accordingly, the communication system 5 is protected against otherwise possible malfunction or errors.

Figure 15A:
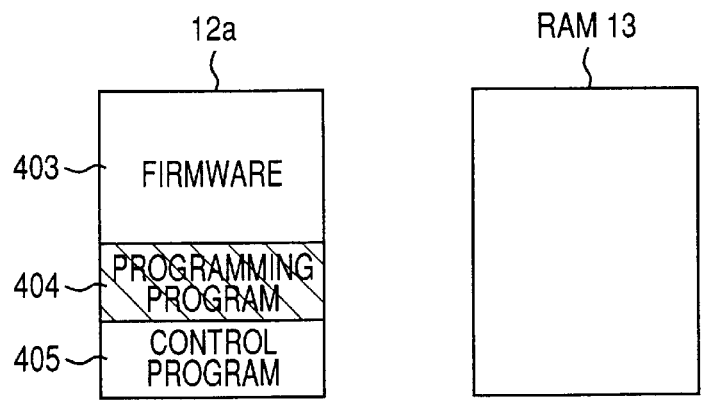
FIGS. 15A, 15B and 15C are views illustrating an operation of the printer, to program its programmable ROM.

There will next be described operations of the CPU 11 of the printer 10 when the firmware file 300 is transmitted to the printer 10. The programmable storage area 12a of the programmable ROM 12 stores a firmware 403, a programming program 404 and a control program 405, as indicated in FIG. 15A. The firmware 403 is a small-volume processing program for controlling the printing portion 17. The programming program 404 is used for reprogramming the programmable storage area 12a, that is, for replacing the firmware 403, programmable program 404 and control program 405 with the firmware file 300 which has been transmitted to the printer 10 and which includes the firmware 303, programming program 304 and control program 305. The control program 405 is used for copying the programming program 404 into the RAM 13 and effecting other processing operations.

Figure 16:
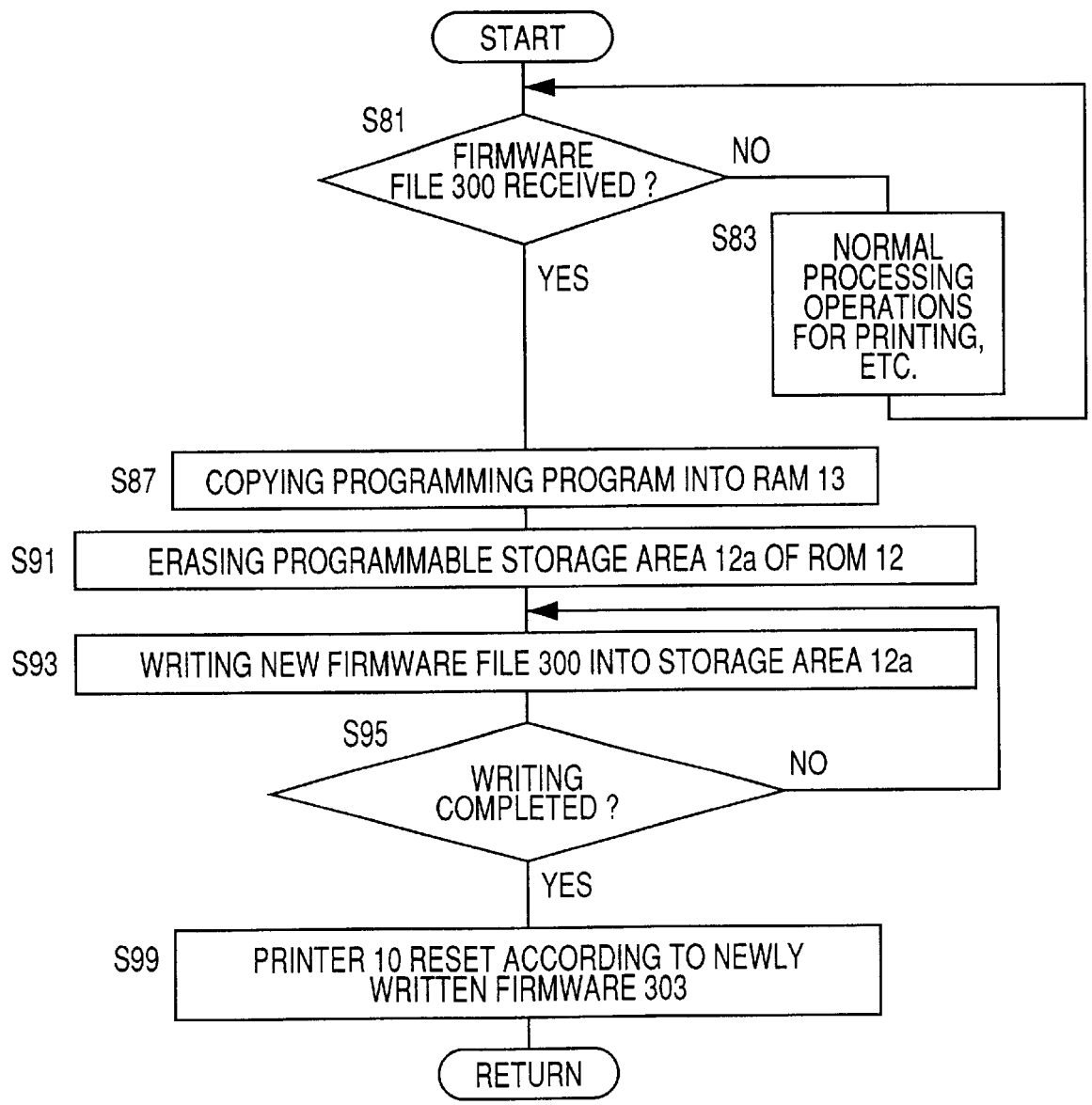
FIG. 16 is a flow chart illustrating the ROM programming operation of the printer.

The CPU 11 is adapted to execute a routine illustrated in the flow chart of FIG. 16, according to the control program 405. The routine is initiated with step S81 to determine whether the firmware file 300 has been received. If a negative decision (NO) is obtained in step S81, the control flow goes to step S83 in which normal processing operations for controlling the printer 10 to effect a printing operation are implemented according to the firmware 403 and a processing program stored in the non-programmable storage area of the ROM 12. Steps S81 and S83 are repeatedly implemented until an affirmative decision (YES) is obtained in step S81. That is, the normal printing operation is performed by the printer 10 until the firmware file 300 has been received.

The normal processing operations implemented in step S83 include not only operations to control the printing portion 17, but also an operation to transmit the device information 100 to the manager G, in response to a request calling for the device information 100 in step S1. The firmware file 300 which the printer 10 receives includes a header which includes an indicator informing the printer 10 that the firmware file 300 used for programming the programmable storage area 12a of the programmable ROM 12 follows the header. The affirmative decision (YES) is obtained in step S81 when the CPU 11 recognizes the firmware file identifier.

When the printer 10 has received the firmware file 300, the control flow goes to step S87 in which the programming program 404 is copied into the RAM 13, as indicated in FIG. 13B. Then, steps S91, S93, S95 and S99 are implemented to reprogram the programmable storage area 12a, that is, to replace the firmware 403, programming program 404 and control program 405 with the received firmware file 300, as indicated in FIG. 13C.

Described in detail, the data stored in the programmable storage area 12a are entirely erased in step S91. Then, the control flow goes to step S93 in which the received firmware file 300 (consisting of the firmware 303, programming program 304 and control program 305) is written in the programmable storage area 12a. Step S83 is followed by step S93 to determine whether the writing of the firmware file 300 is completed. Steps S93 and S95 are repeatedly implemented until an affirmative decision (YES) is obtained in step S95. When the affirmative decision is obtained, the control f low goes to step S99 in which the CPU 11 commands the ROM 12 to effect necessary processing operations such as an operation to reset the printer 10 according to the data stored in the ROM 12, which data include the newly written firmware 303, so that the normal printing operation can be performed according to the firmware 303 in the programmable storage area 12a and the other processing program stored in the non-programmable storage area of the ROM 12.

Figure 15B:
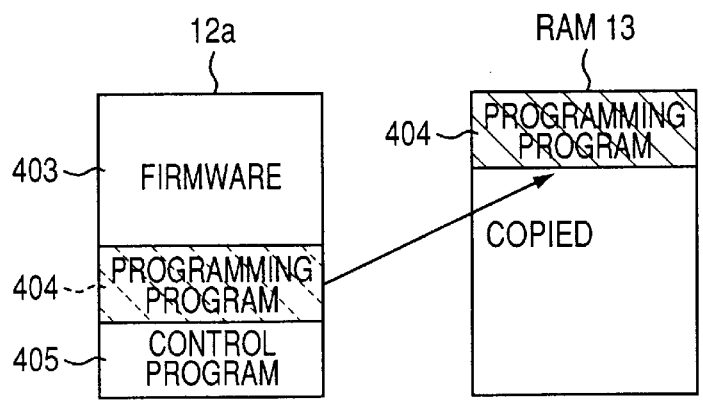
Figure 15C:
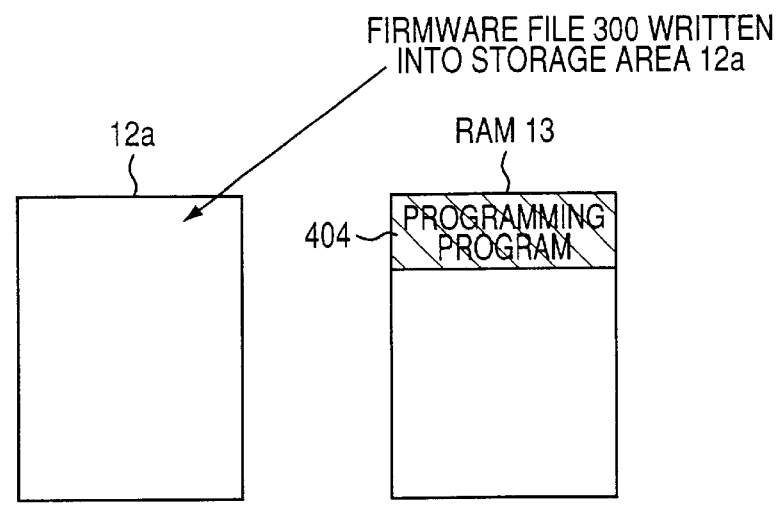

As described above, the printer 10 is adapted to first copy the programming program 404 into the RAM 13, then erase the data currently stored in the programmable storage area 12a of the ROM 12, and finally write the received firmware file 300 in the storage area 12a. Thus, the programmable storage area 12a can be reprogrammed in a reduced time, without increasing the mechanical and control complexity of the printer 10, while assuring full utilization of the data storage capacity of the ROM 12. It is appreciated that the newly written programming program 304 and control program 305 can be used (as the programs 404 and 405 as indicated in FIG. 15B) when the programmable storage area 12a is reprogrammed upon reception of a further new firmware file for further upgrading the printer 10.

The CPU 11 automatically initiates the operations in steps S87–S95 upon reception of the firmware file 300, to reprogram the programmable storage area 12a. After the completion of the writing of the firmware file 300 (with the affirmative decision obtained in step S95), the normal operation of the printer 12 according to the newly written firmware file 300 is automatically made available. Accordingly, the non-productive time of the printer 10 due to the programming of the programmable storage area 12a is significantly shortened.

Like the programmable storage area 12a, the programmable storage area 6a of the ROM 6 of the NIC 1 stores a firmware, a programming program and a control program, and can be automatically and efficiently reprogrammed in the same manner as described above with respect to the storage area 12a. However, a routine executed by the CPU 5 of the NIC 1 is different from the routine of FIG. 16, since the CPU 5 is required to transmit the firmware file 300 to the printer 10 if the firmware file 300 has been received from the manager G according to the LPR.

Figure 17:
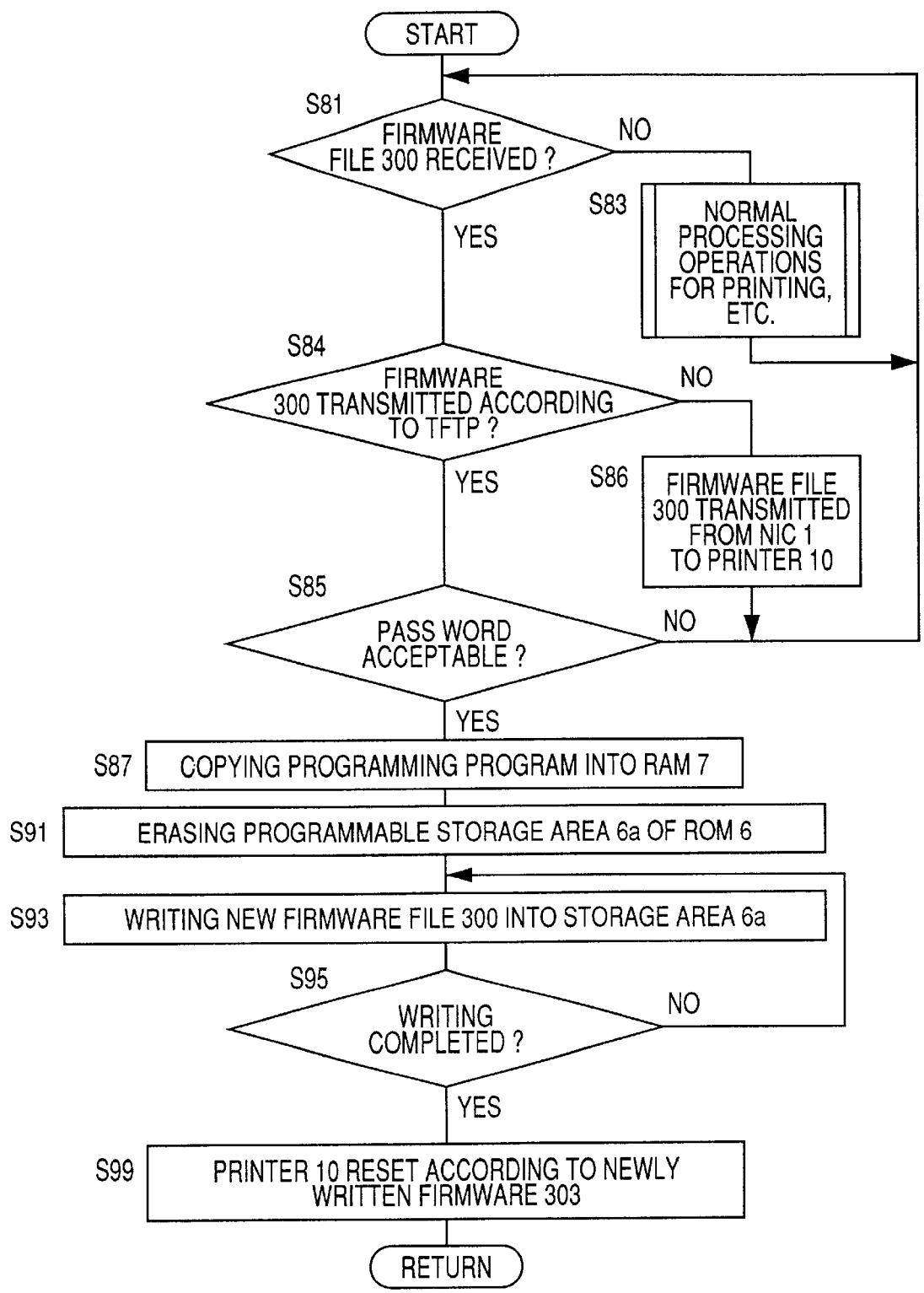
FIG. 17 is a flow chart illustrating an operation of a printer interface device to program its programmable ROM.

The routine to be executed by the CPU 5 is illustrated in the flow chart of FIG. 17, which is similar to that of FIG. 16, except for the addition of steps S84, S85 and S86 between the steps S81 and S87. If the affirmative decision (YES) is obtained in step S81 as a result of reception of the firmware file 300 from the manager G, the control flow goes to step S84 to determine whether the firmware file 300 has been transmitted according to the TFTP (trivial file transfer protocol). If an affirmative decision (YES) is obtained in step S84, the control flow goes to step S85 to determine whether the pass word included in the received firmware file 300 is acceptable or not, that is, whether the pass word is inherent in the manager G. If an affirmative decision (YES) is obtained in step S85, the control flow goes to step S87 and the subsequent steps, to write the received firmware file 300 in the programmable storage area 6a, in place of the data already stored therein.

If the firmware file 300 has been transmitted according to the LPR (line printer remote) protocol, a negative decision (NO) is obtained in step S84, and the control flow goes to step S86 to transmit the received firmware file 300 to the printer 10. In this case, the control flow goes back to step S81. If the pass word included in the received file 300 is not acceptable, a negative decision (NO) is obtained in step S85, and the control flow goes back to step 381. In this event, the received firmware file 300 is discarded.

As described above with respect to the step S65 of FIG. 6, the manager G is adapted to transmit the firmware file 300 according to the TFTP when the firmware file 300 is to be written into the programmable storage area 6a of the ROM 6 of the NIC 1, and according to the LPR when the firmware file 300 is to be written into the programmable storage area 12a of the ROM 12 of the printer 10. The CPU 5 of the NIC 1 is assigned to transmit the firmware file 300 to the printer 10 if the firmware file 300 has been transmitted to the NIC 1 according to the LPR. The present arrangement has the following advantages:

Since the protocol used for transmitting the firmware file 300 is used to make a determination as to whether the firmware file 300 received by the NIC 1 should be written in the programmable storage area 6a of the ROM 6 of the NIC 1 itself or in the programmable storage area 12a of the ROM 12 of the printer 10, the firmware file 300 need not include any data or discriminator which permits the above determination. Accordingly, the firmware file 300 can be easily transmitted from the manager G, with a simple control arrangement, leading to a reduced cost of manufacture of the manager G, and improved efficiency of transmission of the firmware file 300.

Further, the writing of the firmware file 300 into the ROM 6 of the NIC 1 is permitted only when the pass word included therein is acceptable. This arrangement makes it possible to prevent the ROM 6 from being reprogrammed by a firmware which is received from a computer other than the manager G. If an inappropriate firmware were written in the programmable storage area 6a of the ROM 6 of the NIC 1, there would be a risk that data communication between the NIC 1 and the manager G is totally impossible. The present arrangement is free from this risk. Since the solution employed is the mere use of the pass word in the TFTP message in place of a pass name, as indicated in FIG. 13B, the solution assures a high degree of operating reliability of the communication system S, without increasing its complexity.

As described above in detail, the NIC 1 and the printer 10 in the present communication system are adapted to reprogram the ROM 6 or ROM 12 at one time in a comparatively short time, using the same programming program, with comparatively simple physical and control arrangements, while assuring full utilization of the data storage capacity of the ROMs 6, 12. Further, the screen view 200 provided on the CRT 54 facilitates the selection of the desired processing devices whose programmable ROMs are to be programmed.

While the foregoing description primarily refers to the combination of the printer 12 and the corresponding NIC 1, the description substantially applied to the combination of the parallel printer 40 and color image scanner 70 and the corresponding NIC 1, which are shown in FIG. 1. The sheet sorter 80 connected to the printer 40 may be an intelligent one incorporating a CPU. In this case, the printer 50 transmits to the manager G the device information of the sheet sorter 80 as well as the device information 100 (of the printer 40 and the corresponding NIC 1).

It will be understood that step S87 of the flow chart of FIG. 16 corresponds to an operation of copying the programming program into the RAM 7, 13, and steps S91–S95 correspond to an operation of programming (reprogramming) the programmable storage area 6a, 12a of the programmable ROM 6, 12, while step S99 corresponds to an operation of resetting the processing device in the form of the NIC 1 or printer 10 according to the new processing program after the ROM has been programmed. It will also be understood that portions of the CPU 5, 11 and the ROM 6, 12 assigned to implement the copying operation, the reprogramming operation and the resetting operation respectively correspond to copying means for copying the programming program, programming means for programming the programmable storage area 6a, 12a, and resetting means for resetting the processing device. It will further be understood that the transceiver 2 and the connecting line 9 constitute program receiving means for receiving the new processing program from the manager G, and the output port of the manager G constitutes program output means for generating the new processing program which is to replace the original processing program currently stored in the programmable storage area of the programmable ROM of the selected processing device, program transmitting means for transmitting the new processing program to the processing device through the network W. It will also be understood that the device list 201 corresponds to listing means for listing the processing devices with which the new processing program to be sent from the manager G are compatible, and that the icons in the device list 201 and the SELECT ALL SAME TYPE DEVICES button 204 constitute selecting means for selecting the processing devices to which the new processing program is to be transmitted.

It will also be understood that step S69 of the flow chart of FIG. 6 corresponds to an operation of providing a warning that the selected processing device is not compatible with the new processing program to be transmitted, and step 5 of reading the device name 102 and NIC device name 105 of the device information 100 corresponds to an operation of obtaining the device information 100, while step S25 corresponds to an operation of classifying the processing devices. It will further be understood that portions of the CPU 50 and ROM 51 of the manager G assigned to implement the above-indicated operations respectively correspond to warning means for providing the warning, device information obtaining means for obtaining the device information 100, and device classifying means for classifying the processing devices.

While the presently preferred embodiment of the present invention has been described above, it is to be understood that the present invention is not limited to the details of the above embodiment, but may be otherwise embodied.

In the illustrated embodiment, the desired processing devices are selected in step S11 by clicking the mouse when the cursor is located within the corresponding one of the icons in the device list 201. However, the desired processing devices may be selected by specifying their names through the keyboard 53.

The routine of FIG. 16 in the illustrated embodiment is adapted such that the programmable ROM 12 is necessarily programmed (reprogrammed) in steps S87–S95 when the firmware file 300 is transmitted to the printer 10. However, it is possible to permit or inhibit the reprogramming of the ROM 12 only when a predetermined condition is satisfied. For instance, it is possible to inhibit the reprogramming when the firmware 303 in the received firmware file 300 is the same as the firmware 403 currently stored in the programmable storage area 12a. In this case, the header of the firmware file 300 includes an identifier identifying the firmware 303, and the step S87 is preceded by a step of reading the identifier so that the received firmware file 300 is discarded if the identifier identifies the firmware 303 which is identical with the currently stored firmware 403. In this event, the control flow goes back to step S81. Further, a suitable pass word may be used to inhibit the rewriting of the firmware 303 if the firmware 303 is identical with the currently stored firmware 403. The above modifications may apply to the ROM 6 of the NIC 1.

It will be understood that portions of the CPU 11 and the ROM 12 assigned to read the above-indicated identifier of the firmware 303 constitute identifying means for identifying the firmware 303 to determine whether the firmware 303 is identical with the firmware 403 currently stored in the programmable storage area 12a. Further, the printer 10 may be provided with a suitable operator's control for permitting or inhibiting the reprogramming of the programmable storage area 12a, namely, to permit or inhibit the implementation of steps S87–S95.

In the illustrated embodiment, all printers of the same type and all NICs of the corresponding same type are selected by pressing the SELECT ALL SAME TYPE DEVICES button 204. However, all printers of the same type, and all NICs of the same type may be selected independently of each other. IN this case, it is desirable to provide a SELECT ALL SAME TYPE PRINTERS button 204a and a SELECT ALL SAME TYPE NICs button 204b, as indicated in FIG. 18. When the programmable storage areas 6a of the ROMs 6 of all NICs of the same type are reprogrammed, one of the NICs of the desired type is selected by selecting the corresponding icon in the device list 201, and then the SELECT ALL SAME TYPE NICs button 204b is pressed. In this case, the printers connected to the NICs of the selected type are reprogrammed, even when the printers include printers of different types.

In step S87 of the illustrated embodiment, the programming program 404 currently stored in the programmable storage area 12a is copied into the RAM 13. However, the programming program 304 in the received firmware file 300 may be copied into the RAM 13. In this case, only the firmware 303 and the control program 305 are written in the programmable storage area 12a, since the programming program 204 is not used when the storage area 12a is again reprogrammed.

Where the firmware file 300 to be transmitted for reprogramming the ROM 12 or ROM 6 includes the programming program 304 in addition to the firmware 303 and the control program 305, as indicated above, the ROM 12, 6 need not store the programming program 404, so that the effective data storage capacity of the ROM is accordingly increased.

In the illustrated embodiment, the firmware file 300 is designated after the desired processing devices to be reprogrammed have been selected. However, the firmware file 300 may be designated before the desired processing devices are selected. In this case, the device list 201 may be prepared based on the device name 102 and the NIC device name 105 of the device information 100, so that the device list 201 lists only the processing devices which are compatible with the already designated firmware file 300. This arrangement enables the operator to select only the processing devices compatible with the designated firmware file 300, and therefore makes it possible to eliminate the steps S59, S61 and S69, resulting in an increased programming efficiency of the ROM 6, 12. However, the preparation of the device list 201 takes a relatively long time to check the compatibility of the processing devices and the designated firmware file, where the number of the processing devices is relatively large. In this sense, it is desirable to first select the desired processing devices and then designate the firmware file, where the number of the processing devices provided in the system is relatively large.

The screen view 200 including the device list 201 is useful for any system other than the communication system S described above, for instance, for the conventional system for programming a programmable ROM.

It is also noted that the feature of programming a programmable ROM by copying the programming program into a according to the present invention is equally applicable to a processing device which includes a plurality of programmable ROMs. For instance, the printer 10 may include a plurality of programmable ROMs which store respective different firmwares. In this case, the header of each of the firmware file s to be transmitted to the printer 10 includes a command which indicates one of the programmable ROMs in which the firmware file in question is to be rewritten.

The software programs executed by the CPU 50 of the manager G for listing and selecting the processing devices and transmitting the firmware file 300 to the selected processing devices may be stored in a ROM (e. g. ROM 51) or RAM, or in any other suitable data storage medium such as CD-ROM, a floppy disc, a program cartridge insertable into a card slot, or an internet file server. Further, the software programs for copying the programming program into the RAM 7, 13 and for programming the programmable storage area 6a, 12a of the programmable ROM 6, 12 may be stored in a ROM or RAM, or in any other suitable data storage medium as indicated above. That is, the program output means or program transmitting means may be adapted to generate or transmit the firmware file 300 and other software programs so as to be stored in such a suitable data storage medium as indicated above, so that the program receiving means may receive the firmware file 300, etc. from the data storage medium.

The principle of the present invention is applicable to not only the illustrated communication system including the printers 10 and other imaging devices, but also to any other communication systems such as a background music service system for singing at local terminal stations. In the communication system including imaging devices such as printers, however, the processing programs to be stored in the ROMs of the imaging devices of different types differ from each other, so that the firmware file 300 must include the address 302 which indicates the ROM of the particular imaging device in which the firmware file 300 is to be written. The address 302 is effective to assure correct and efficient programming of the ROMS of the different types of the imaging devices.

It is to be understood that the present invention may be embodied with various other changes, modifications and improvements, which may occur to those skilled in the art, without departing from the spirit and scope of the present invention defined in the following claims:

What is claimed is:

1. A programming device for programming a programmable ROM having a programmable storage area which can be programmed and which stores a programming program for programming said programmable storage area, and a processing program for effecting a processing operation other than said programming of said programmable storage area, said programming device comprising:

copying means for copying said programming program into a RAM connected to a CPU which is connected to said programmable ROM as well as said RAM; and programming means for replacing said processing program currently stored in said programmable storage area with a new processing program, according to said programming program stored in said.

2. A programming device according to claim 1, wherein said programming means commands said CPU to execute said programming program stored in said RAM, to thereby program said programmable storage area, said programming device further comprising:

resetting means operable upon completion of programming of said programmable storage area by said programming means, for commanding said CPU to execute program data currently stored in said programmable ROM.

3. A programming device according to claim 2, wherein said program data currently stored in said programmable ROM after completion of programming of said programmable storage area include said new processing program which has been stored in said programmable storage area by said programming means.

4. A programming device according to claim 2, wherein said program data currently stored in said programmable ROM after completion of programming of said programmable storage area include a program stored in a non-programmable storage area of said programmable ROM.

5. A programming device according to claim 1, further comprising program receiving means for receiving said new processing program to be newly stored in said programmable storage area, and wherein said copying means and said programming means are operable, upon reception of said new processing program by said program receiving means, to copy said programming program into said RAM and write said new processing program in said programmable storage area, in place of the processing program which is stored in said programmable storage area upon the reception of said new processing program.

6. A programming device according to claim 5, wherein said programmable ROM is provided in each of a plurality of processing devices which are connected to each other through a network and each of which is operated according to said processing program stored in said programmable storage area of said programmable ROM.

7. A programming device for programming a programmable ROM having a programmable storage area which can be programmed and which stores a processing program, said programming device comprising:

program receiving means for receiving a new processing program which is to replace the processing program currently stored in said programmable storage area of said programmable ROM, and a programing program for programming said programmable storage area by replacing the currently stored processing program with said new processing program;

copying means operable upon reception of said new processing program and said programming program by said program receiving means, for copying said programming program into a RAM connected to a CPU which is connected to said programmable ROM as well as said RAM;

programming means for commanding said CPU to execute said programming program stored in said RAM, to thereby replace said processing program currently stored in said programmable storage area with said new processing program; and resetting means operable upon completion of programming of said programmable storage area by said programming means, for commanding said CPU to execute program data currently stored in said programmable ROM.

8. A programming device according to claim 7, wherein said program receiving means receives said new processing program together with an identifier identifying said new processing program, said programming device further comprising determining means for determining, based on said identifier, whether the processing program currently stored in said programmable storage area of said programmable ROM should be replaced with said new processing program, and wherein said programming means is inhibited from replacing the processing program currently stored in said programmable storage area with said new processing program, when said determining means determines that the processing program currently stored in said programmable storage area should not be replaced with said new processing program.

9. A program output device comprising output means for generating a new processing program which is to replace an original processing program stored in a programmable storage area of a programmable ROM included in a processing device which further includes a CPU operable to execute said processing program, and a RAM for temporarily storing data for use by said CPU to execute said processing program, wherein an improvement comprises:

said output means supplying said processing device with said new processing program, and (a) an indicator informing said processing device that said original processing program currently stored in said programmable storage area is to be replaced with said new processing program, (b) a programming program for replacing said original processing program with said new processing program, and (c) a software program for commanding said CPU to copy said programming program into said RAM and to execute said programming program stored in said RAM, to thereby replace said original processing program with said new processing program.

10. A program output device according to claim 9, wherein said output means transmits said new processing program, said indicator, said programming program and said software program, to said processing device through a communication line.

11. A program output device according to claim 9, wherein said output means supplies said new processing program, said indicator, said programming program and said software program so as to be stored in an IC cartridge which is inserted into a card slot provided in said processing device.

12. A program output device according to claim 9, wherein said indicator includes a command for commanding said CPU of said processing device to replace said original processing program with said new processing program.

13. A program output device according to claim 9, wherein said processing device which is supplied with said new processing program, said indicator information, said programming program and said software program is one of a plurality of imaging devices of different types each arranged to reproduce an image, and said new processing program includes an address indicative of said programmable ROM of said one of said plurality of imaging devices as said processing device.

14. A communication system comprising:

a plurality of processing devices each of which includes a programmable ROM having a programmable storage area which can be programmed and which stores a processing program, a CPU operable to execute said processing program, and a RAM for temporarily storing data for use by said CPU to execute said processing program;

a program transmitting device including transmitting means for transmitting a new processing program to selected at least one of said plurality of processing devices, so that the processing program currently stored in said programmable storage area of the programmable ROM of each of said selected at least one of said processing devices is replaced with said new processing program; and a network through which said program transmitting device is connected to said plurality of processing devices, and wherein said program transmitting device further includes:

listing means for listing at least one of said plurality of processing devices to which said new processing program can be transmitted by said transmitting means; and selecting means for selecting at least one of said at least one processing device listed by said listing means, to which said new processing program is desired to be transmitted by said transmitting means, wherein said transmitting means of said program transmitting device transmits to each of said at least one processing device selected by said selecting means, said new processing program, and (a) an indicator informing said each processing device that the original processing program currently stored in said programmable storage area is to be replaced with said new processing program, (b) a programming program for replacing said original processing program with said new processing program, and (c) a software program for commanding said CPU to copy said programming program into said RAM and to execute said programming program stored in said RAM, to thereby replace said original processing program with said new processing program.

15. A communication system according to claim 14, wherein said program transmitting device further includes:

device information obtaining means for obtaining device information indicative of a type of each of the processing devices listed by said listing means; and device classifying means for classifying the processing devices, based on said device information obtained by said device information obtaining means, and wherein said selecting means is selectively operable in a first mode in which said processing devices are sequentially selected one after another, and in a second mode in which the processing devices of the same type are selected at one time.

16. A data storage medium accessible by a computer and storing a software program for operating said computer to function as said transmitting means, said listing means, said selecting means, said device information obtaining means and said device classifying means of said program transmitting device as recited in claim 15.

17. A communication system according to claim 14, wherein said new processing program transmitted by said transmitting means of the program transmitting device is accompanied by an identifier identifying said new processing program, and wherein said program transmitting device further includes:

device information obtaining means for obtaining device information indicative of a type of each of the processing devices listed by said listing means, before said new processing program is transmitted by said transmitting means; and warning means for providing a warning if the type of the processing device indicated by said device information obtained by said device information obtaining means is not compatible with said new processing program identified by said identifier.

18. A data storage medium accessible by a computer and storing a software program for operating said computer to function as said transmitting means, said listing means, said selecting means, said device information obtaining means and said warning means of said program transmitting device as recited in claim 17.

19. A data storage medium accessible by a computer and storing a software program for operating said computer to function as said transmitting means, said listing means and said selecting means of said program transmitting device as recited in claim 14.

20. A communication system comprising:
   a plurality of processing devices each of which includes a programmable ROM having a programmable storage area which can be programmed and which stores a processing program, a CPU operable to execute said processing program, and a RAM for temporarily storing data for use by said CPU to execute said processing program;
   a program transmitting device including transmitting means for transmitting a new processing program to selected at least one of said plurality of processing devices, so that the processing program currently stored in said programmable storage area of the programmable ROM of each of said selected at least one of said processing devices is replaced with said new processing program; and
   a network through which said program transmitting device is connected to said plurality of processing devices, wherein at least one of said plurality of processing devices includes a programming device for programming the programmable ROM having the programmable storage area which stores a programming program for programming the programmable storage area, and the processing program for effecting a processing operation other than said programming of the programmable storage area, the programming device including:
      copying means for copying the programming program into the RAM connected to the CPU which is connected to the programmable ROM as well as the RAM, and
      programming means for replacing the processing program currently stored in the programmable storage area with the new processing program, according to the programming program stored in the RAM, and
   program receiving means for receiving the new processing program to be newly stored in the programmable storage area, wherein said copying means and said programming means are operable, upon reception of the new processing program by said program receiving means, to copy the programming program into the RAM and write the new processing program in the programmable storage area, in place of the processing program which is stored in the programmable storage area upon the reception of the new processing program, and wherein said program transmitting device further includes:
      listing means for listing at least one of said plurality of processing devices to which said new processing program can be transmitted by said transmitting means; and
      selecting means for selecting at least one of said at least one processing device listed by said listing means, to which said new processing program is desired to be transmitted by said transmitting means.

21. A communication system according to claim 20, wherein said program transmitting device further includes:
   device information obtaining means for obtaining device information indicative of a type of each of the processing devices listed by said listing means; and
   device classifying means for classifying the processing devices, based on said device information obtained by said device information obtaining means,
      and wherein said selecting means is selectively operable in a first mode in which said processing devices are sequentially selected one after another, and in a second mode in which the processing devices of the same type are selected at one time.

22. A data storage medium accessible by a computer and storing a software program for operating said computer to function as said transmitting means, said listing means, said selecting means, said device information obtaining means and said device classifying means of said program transmitting device as recited in claim 21.

23. A communication system according to claim 20, wherein said new processing program transmitted by said transmitting means of the program transmitting device is accompanied by an identifier identifying said new processing program, and wherein said program transmitting device further includes:
   device information obtaining means for obtaining device information indicative of a type of each of the processing devices listed by said listing means, before said new processing program is transmitted by said transmitting means; and
   warning means for providing a warning if the type of the processing device indicated by said device information obtained by said device information obtaining means is not compatible with said new processing program identified by said identifier.

24. A data storage medium accessible by a computer and storing a software program for operating said computer to function as said transmitting means, said listing means, said selecting means, said device information obtaining means and said warning means of said program transmitting device as recited in claim 23.

25. A data storage medium accessible by a computer and storing a software program for operating said computer to function as said transmitting means, said listing means and said selecting means of said program transmitting device as recited in claim 20.

26. A communication system comprising:
   a plurality of processing devices each of which includes a programmable ROM having a programmable storage area which can be programmed and which stores a processing program, a CPU operable to execute said processing program, and a RAM for temporarily storing data for use by said CPU to execute said processing program;
   a program transmitting device including transmitting means for transmitting a new processing program to selected at least one of said plurality of processing devices, so that the processing program currently stored in said programmable storage area of the programmable ROM of each of said selected at least one of said processing devices is replaced with said new processing program; and
   a network through which said program transmitting device is connected to said plurality of processing devices, wherein at least one of said plurality of processing devices includes a programming device for programming the programmable ROM having the programmable storage area which stores a programming program for programming the programmable storage area, and the processing program for effecting a processing operation other than said programming of the programmable storage area, the programming device including:

copying means for copying the programming program into the RAM connected to the CPU which is connected to the programmable ROM as well as the RAM, and programming means for replacing the processing program currently stored in the programmable storage area with the new processing program, according to the programming program stored in the RAM, and program receiving means for receiving the new processing program to be newly stored in the programmable storage area, wherein said copying means and said programming means are operable, upon reception of the new processing program by said program receiving means, to copy the programming program into the RAM and write the new processing program in the programmable storage area, in place of the processing program which is stored in the programmable storage area upon the reception of the new processing program, wherein said program transmitting device further includes:

listing means for listing at least one of said plurality of processing devices to which said new processing program can be transmitted by said transmitting means; and selecting means for selecting at least one of said at least one processing device listed by said listing means, to which said new processing program is desired to be transmitted by said transmitting means, and wherein said transmitting means transmits said programming program together with said new processing program to said program receiving means of said programming device of each of said at least one processing device selected by said selecting means.

27. A communication system according to claim 26, wherein said program transmitting device further includes:

device information obtaining means for obtaining device information indicative of a type of each of the processing devices listed by said listing means; and device classifying means for classifying the processing devices, based on said device information obtained by said device information obtaining means, and wherein said selecting means is selectively operable in a first mode in which said processing devices are sequentially selected one after another, and in a second mode in which the processing devices of the same type are selected at one time.

28. A data storage medium accessible by a computer and storing a software program for operating said computer to function as said transmitting means, said listing means, said selecting means, said device information obtaining means and said device classifying means of said program transmitting device as recited in claim 27.

29. A communication system according to claim 26, wherein said new processing program transmitted by said transmitting means of the program transmitting device is accompanied by an identifier identifying said new processing program, and wherein said program transmitting device further includes:

device information obtaining means for obtaining device information indicative of a type of each of the processing devices listed by said listing means, before said new processing program is transmitted by said transmitting means; and warning means for providing a warning if the type of the processing device indicated by said device information obtained by said device information obtaining means is not compatible with said new processing program identified by said identifier.

30. A data storage medium accessible by a computer and storing a software program for operating said computer to function as said transmitting means, said listing means, said selecting means, said device information obtaining means and said warning means of said program transmitting device as recited in claim 29.

31. A data storage medium accessible by a computer and storing a software program for operating said computer to function as said transmitting means, said listing means and said selecting means of said program transmitting device as recited in claim 26.

32. A communication system comprising:

a plurality of processing devices each of which includes a programmable ROM having a programmable storage area which can be programmed and which stores a processing program, a CPU operable to execute said processing program, and a RAM for temporarily storing data for use by said CPU to execute said processing program;

a program transmitting device including transmitting means for transmitting a new processing program to selected at least one of said plurality of processing devices, so that the processing program currently stored in said programmable storage area of the programmable ROM of each of said selected at least one of said processing devices is replaced with said new processing program; and a network through which said program transmitting device is connected to said plurality of processing devices, and wherein said program transmitting device further includes:

listing means for listing the processing devices to which said new processing program can be transmitted by said transmitting means;

selecting means for selecting at least one of said at least one processing device listed by said listing means, to which said new processing program is desired to be transmitted by said transmitting means;

device information obtaining means for obtaining device information indicative of a type of each of the processing devices listed by said listing means; and device classifying means for classifying the processing devices, based on said device information obtained by said device information obtaining means, and wherein said selecting means is selectively operable in a first mode in which said processing devices are sequentially selected one after another, and in a second mode in which the processing devices of the same type are selected tone time.

33. A communication system according to claim 32, wherein said new processing program transmitted by said transmitting means of the program transmitting device is accompanied by an identifier identifying said new processing program, and wherein said program transmitting device further includes:

device information obtaining means for obtaining device information indicative of a type of each of the processing devices listed by said listing means, before said new processing program is transmitted by said transmitting means; and warning means for providing a warning if the type of the processing device indicated by said device information obtained by said device information obtaining means is not compatible with said new processing program identified by said identifier.

34. A data storage medium accessible by a computer and storing a software program for operating said computer to function as said transmitting means, said listing means, said selecting means, said device information obtaining means and said warning means of said program transmitting device as recited in claim 33.

35. A data storage medium accessible by a computer and storing a software program for operating said computer to function as said transmitting means, said listing means, said selecting means, said device information obtaining means and said device classifying means of said program transmitting means as defined in claim 32.

36. A printer, comprising:
a printing portion which performs a printing operation;
a RAM;
a CPU to which the RAM is connected;
a programmable ROM which is connected to the CPU and which has a programmable storage area that can be programmed, and that stores a programming program for programming said programmable storage area, and a processing program for effecting a processing operation other than said programming of said programmable storage area; and
a programming device which programs said programmable ROM, said programming device including:
copying means for copying said programming program into said RAM; and
programming means for replacing the processing program currently stored in said programmable storage area with a new processing program, according to said programming program stored in said RAM.

37. A printer, comprising:
a printing portion which performs a printing operation;
a RAM;
a CPU to which the RAM is connected;
a programmable ROM which is connected to the CPU and which has a programmable storage area that can be programmed, and that stores a programming program for programming said programmable storage area, and a processing program for effecting a processing operation other than said programming of said programmable storage area; and
a programming device which programs said programmable ROM, said programming device including:
program receiving means for receiving a new processing program which is to replace the processing program currently stored in said programmable storage area of said programmable ROM, and a programming program for programming said programmable storage area by replacing the currently stored processing program with said new processing program,
copying means operable upon reception of said new processing program and said programming program by said program receiving means, for copying said programming program into said RAM,
programming means for commanding said CPU to execute said programming program stored in said RAM, to thereby replace the processing program currently stored in said programmable storage area with said new processing program, and
resetting means operable upon completion of programming of said programmable storage area by said programming means, for commanding said CPU to execute program data currently stored in said programmable ROM.

38. A program output device comprising output means for generating a new processing program which is to replace an original processing program stored in a programmable storage area of a programmable ROM included in a printer which further includes a printing portion for performing a printing operation, a CPU operable to execute said processing program, and a RAM for temporarily storing data for use by said CPU to execute said processing program, wherein an improvement comprises:
said output means supplying the printer with said new processing program, and (a) an indicator informing the printer that said original processing program currently stored in said programmable storage area is to be replaced with said new processing program, (b) a programming program for replacing said original processing program with said new processing program, and (c) a software program for commanding said CPU to copy said programming program stored in said RAM, to thereby replace said original processing program with said new processing program.

39. A communication system comprising:
a plurality of printers each of which includes a printing portion which performs a printing operation, and a programmable ROM having a programmable storage area which can be programmed and which stores a processing program, a CPU operable to execute said processing program, and a RAM for temporarily storing data for use by said CPU to execute said processing program;
a program transmitting device including transmitting means for transmitting a new processing program to selected at least one of said plurality of printers, so that the processing program currently stored in said programmable storage area of the programmable ROM of each of said selected at least one of said printers is replaced with said new processing program; and
a network through which said program transmitting device is connected to said plurality of printers, wherein said program transmitting device further includes:
listing means for listing at least one of said plurality of printers to which said new processing program can be transmitted by said transmitting means, and
selecting means for selecting at least one of said at least one printer listed by said listing means, to which said new processing program is desired to be transmitted by said transmitting means, and wherein said transmitting means of said program transmitting device transmits, to each of said at least one printer selected by said selecting means, said new processing program, and (a) an indicator informing said each printer that the original processing program currently stored in said programmable storage area is to be replaced with said new processing program, (b) a programming program for replacing said original processing program with said new processing program, and (c) a software program for commanding said CPU to copy said programming program into said RAM and to execute said programming program stored in said RAM, to thereby replace said original processing program with said new processing program.

40. A communication system comprising:

a plurality of printers each of which includes a programmable ROM having a programmable storage area which can be programmed and which stores a processing program, a CPU operable to execute said processing program, and a RAM for temporarily storing data for use by said CPU to execute said processing program;

a program transmitting device including transmitting means for transmitting a new processing program to selected at least one of said plurality of printers, so that the processing program currently stored in said programmable storage area of the programmable ROM of each of said selected at least one of said printers is replaced with said new processing program; and a network through which said program transmitting device is connected to said plurality of printers, wherein said program transmitting device further includes listing means for listing the printers to which said new processing program can be transmitted by said transmitting means, selecting means for selecting at least one of the printers listed by said listing means, to which said new processing program is desired to be transmitted by said transmitting means, device information obtaining means for obtaining device information indicative of a type of each of the printers listed by said listing means, and device classifying means for classifying the printers, based on said device information obtained by said device information obtaining means, and wherein said selecting means is selectively operable in a first mode in which said printers are sequentially selected one after another, and in a second mode in which the printers of the same type are selected at one time.

* * * * *